US011873675B1

(12) United States Patent
Lange et al.

(10) Patent No.: US 11,873,675 B1
(45) Date of Patent: Jan. 16, 2024

(54) FRAMED GLASS ADJUSTMENT ASSEMBLIES

(71) Applicant: Falkbuilt Ltd., Calgary (CA)

(72) Inventors: Jeffrey K. Lange, Calgary (CA); Dale R. Marshall, Foothills (CA)

(73) Assignee: Falkbuilt Ltd., Calgary (CA)

(*) Notice: Subject to any disclaimer, the term of this patent is extended or adjusted under 35 U.S.C. 154(b) by 0 days.

(21) Appl. No.: 17/949,674

(22) Filed: Sep. 21, 2022

(51) Int. Cl.
*E06B 3/54* (2006.01)
*E06B 3/58* (2006.01)
*E06B 3/96* (2006.01)
*E06B 3/968* (2006.01)
*E06B 3/964* (2006.01)

(52) U.S. Cl.
CPC .......... *E06B 3/5864* (2013.01); *E06B 3/5454* (2013.01); *E06B 3/5885* (2013.01); *E06B 3/9644* (2013.01); *E06B 3/9687* (2013.01)

(58) Field of Classification Search
CPC . E06B 3/02; E06B 3/54; E06B 3/5454; E06B 3/585; E06B 3/5857; E06B 3/5864; E06B 3/5885; E06B 3/9644; E06B 3/9687; E06B 3/98; E06B 3/5409
See application file for complete search history.

(56) References Cited

U.S. PATENT DOCUMENTS 2,707,536 A * 5/1955 Wooten ................. E06B 3/5454 52/204.69
3,233,381 A 2/1966 Von Wedel
3,404,501 A * 10/1968 Von Wedel ........... E06B 3/5409 52/204.64
3,413,761 A 12/1968 Proni
3,780,472 A 12/1973 Biebuyck
3,949,526 A 4/1976 Sherlock
4,237,597 A 12/1980 Auger
4,397,124 A 8/1983 Redman
4,763,453 A 8/1988 Horgan, Jr.
5,444,958 A * 8/1995 Lu ......................... E06B 3/5454 52/771
11,060,341 B1 7/2021 Sprague
(Continued)

FOREIGN PATENT DOCUMENTS

BR 102015018655 A2 * 5/2016
CN 202450981 U 9/2012
(Continued)

*Primary Examiner* — Ryan D Kwiecinski
(74) *Attorney, Agent, or Firm* — Steven L. Nichols; Fabian VanCott

(57) ABSTRACT

Examples of glass adjustment assemblies arc described. An example glass adjustment assembly includes a locking member and a clamp that includes a base member with side extensions on either side. The example glass adjustment assembly also includes a horizontal connection member. The side extensions of the clamp are to be slidably mounted to the horizontal connection member. The locking member is to be variably attached to the horizontal connection member. The variable attachment is to apply controlled pressure on the base member of the clamp which is transmitted to a glass panel through an adhesive tape. The pressure applied to the glass panel may generate tension in a frame structure, which reduces sag and allows for thin members of the frame structure. In some examples, external hardware can attach to the vertical and/or horizontal connection members.

19 Claims, 24 Drawing Sheets

(56) References Cited

U.S. PATENT DOCUMENTS

| | | | | |
|---|---|---|---|---|
| 2011/0239560 | A1 | 10/2011 | Landeros | |
| 2020/0318421 | A1 * | 10/2020 | Murray | E06B 3/02 |
| 2022/0018177 | A1 | 1/2022 | Mourchid | |

FOREIGN PATENT DOCUMENTS

| | | | | | |
|---|---|---|---|---|---|
| CN | 213234738 | U | | 5/2021 | |
| DE | 2224264 | A1 | | 11/1973 | |
| DE | 2558018 | A1 | | 6/1977 | |
| DE | 2437296 | C2 | | 11/1982 | |
| EP | 427644 | A | * | 5/1991 | E06B 3/5454 |
| EP | 427644 | A1 | | 5/1991 | |
| EP | 403439 | B1 | | 12/1993 | |
| EP | 698716 | A1 | | 2/1996 | |
| GB | 2392470 | B | | 11/2005 | |
| GB | 2569209 | A | * | 6/2019 | E06B 3/96 |
| IT | 201900003263 | A1 | | 9/2020 | |

* cited by examiner

FRAMED GLASS ADJUSTMENT ASSEMBLIES

BACKGROUND

Glass panels provide innovative solutions for wall components, Glass panels may be used in door or window applications. Glass panels may be used for quick and efficient onsite installation. Glass panels may allow for the transmission of light and may be aesthetically pleasing. Glass panels may be assembled within a surrounding frame. Glass panels with a thin frame profile allow for the maximum transmission of light.

Figure 1:
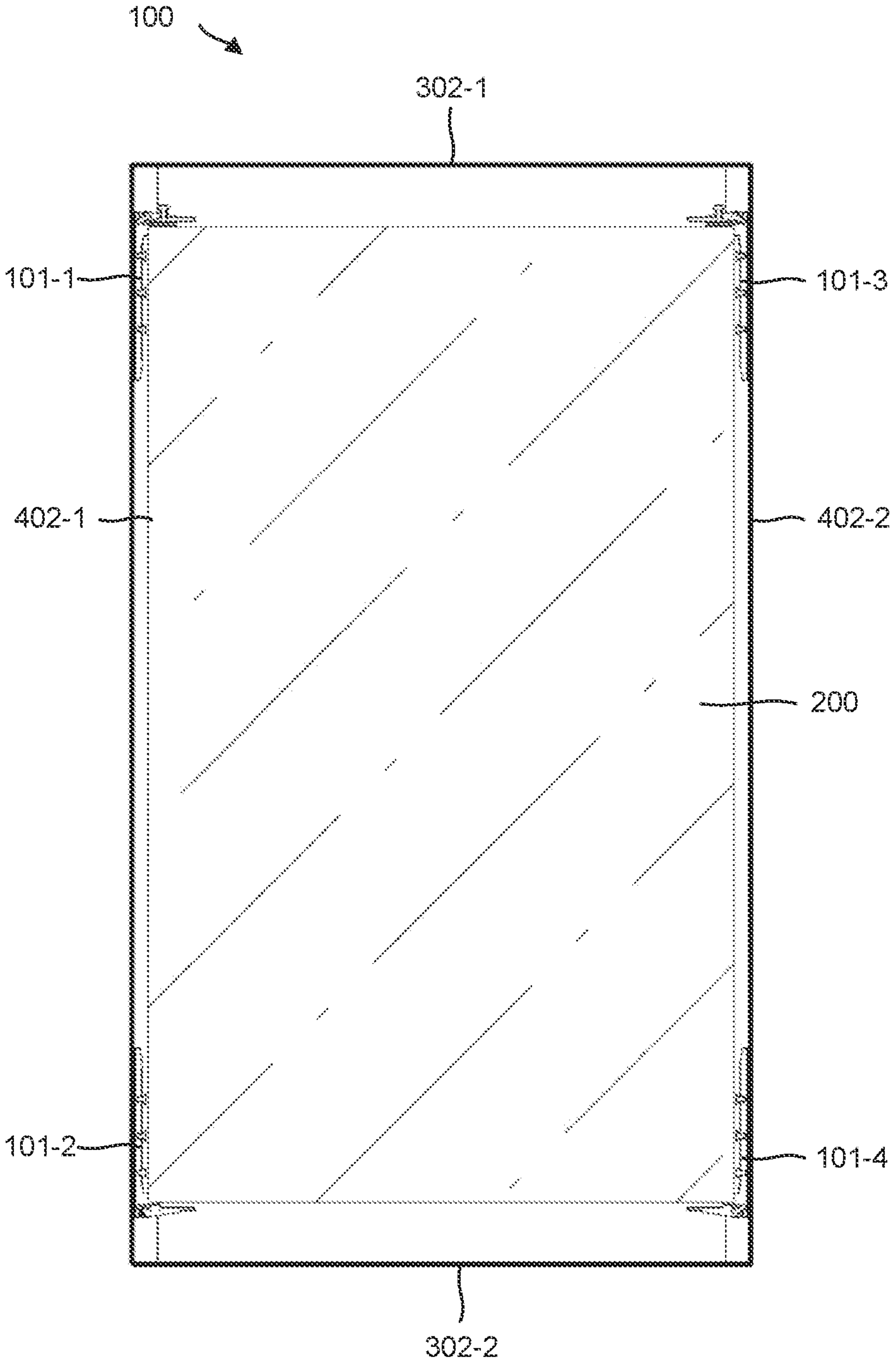
FIG. 1 illustrates a front section view of a glass panel assembly according to an example of the principles described herein.

DETAILED DESCRIPTION in general, construction projects may involve the purchase and delivery to a job site of 30% more materials than what is needed. These projects rely on materials/tools such as screw guns, time, garbage bins, and a laborer to fill the garbage bins with waste created from the construction. When the project is completed, the bin is hauled to a dump.

In another example referred to as prefabricated construction, everything needed is built in a factory or factories, loaded in trucks, and then taken to a jobsite After the components are unloaded, the components are placed in precisely designated locations and orientations. Each component is then individually leveled and attached to adjacent components. In some examples, glass panels may be used in prefabricated construction. It should be noted that glass panels may be used in other types of construction.

The present specification describes glass adjustment assemblies that provide a secure corner connection between horizontal and vertical frame structures to secure a glass panel. In some examples, the glass adjustment assemblies may be used to make variable corner connections of a door frame, a window, or other structure that holds a glass panel. Workspaces, office buildings, residential buildings, classroom settings, and hospital rooms are just a few examples of environments in which these glass adjustment assemblies may be used.

In an example, a glass adjustment assembly includes a locking member and a moveable clamp that includes a base member with side extensions on either side. The example glass adjustment assembly also includes a horizontal connection member. The side extensions of the clamp are to be slidably mounted to the horizontal connection member. The locking member is to be variably attached to the horizontal connection member. The variable attachment is to apply controlled pressure on the base member of the clamp which is transmitted to a glass panel through an adhesive tape.

In another example, a glass adjustment assembly includes a vertical connection member that is to attach to an end of a vertical frame structure. The glass adjustment assembly also includes a horizontal connection member that is to attach to an end of a horizontal frame structure. A cinching member is to attach the vertical connection member and the horizontal connection member to a variable degree. A clamp is to slidably attach to the horizontal connection member.

The clamp provides a mounting connection to a glass panel. The glass adjustment assembly further includes a locking member to apply an adjustable pressure to the clamp. The adjustable pressure is transmitted between the glass panel and the horizontal connection member.

In another example, a glass panel assembly is described. The glass panel assembly includes a glass panel. A vertical frame structure having a first end and a second end is positioned along a vertical side of the glass panel. A first horizontal frame structure is positioned along a first horizontal side of the glass panel. A second horizontal frame structure is positioned along a second horizontal side of the glass panel. A first glass adjustment assembly is positioned at a first corner of the glass panel to attach to the first end of the vertical frame structure and the first horizontal frame structure. A second glass adjustment assembly is positioned at a second corner of the glass panel to attach to the second end of the vertical frame structure and the second horizontal frame structure. Each glass adjustment assembly includes a vertical connection member, a horizontal connection member, a cinching member that attaches the vertical connection member and the horizontal connection member to a variable degree, and a clamp attached to the horizontal connection member. The clamp provides a mounting connection on the glass panel. The first glass adjustment assembly further includes a locking member to apply an adjustable pressure to the clamp of the first glass adjustment assembly. The adjustable pressure is transmitted to the glass panel and the second glass adjustment assembly.

Figure 2:
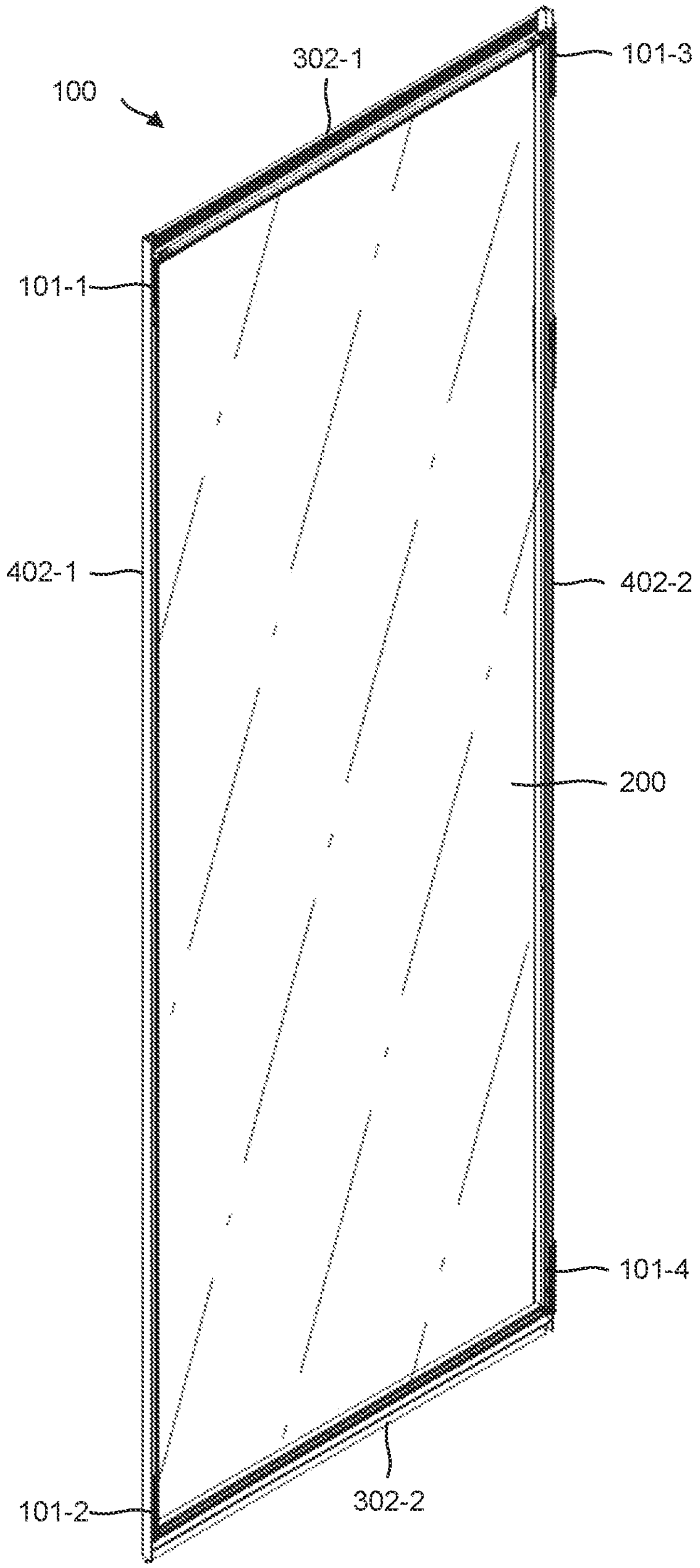
FIG. 2 illustrates a perspective section view of a glass panel assembly according to an example of the principles described herein.
Figure 3:
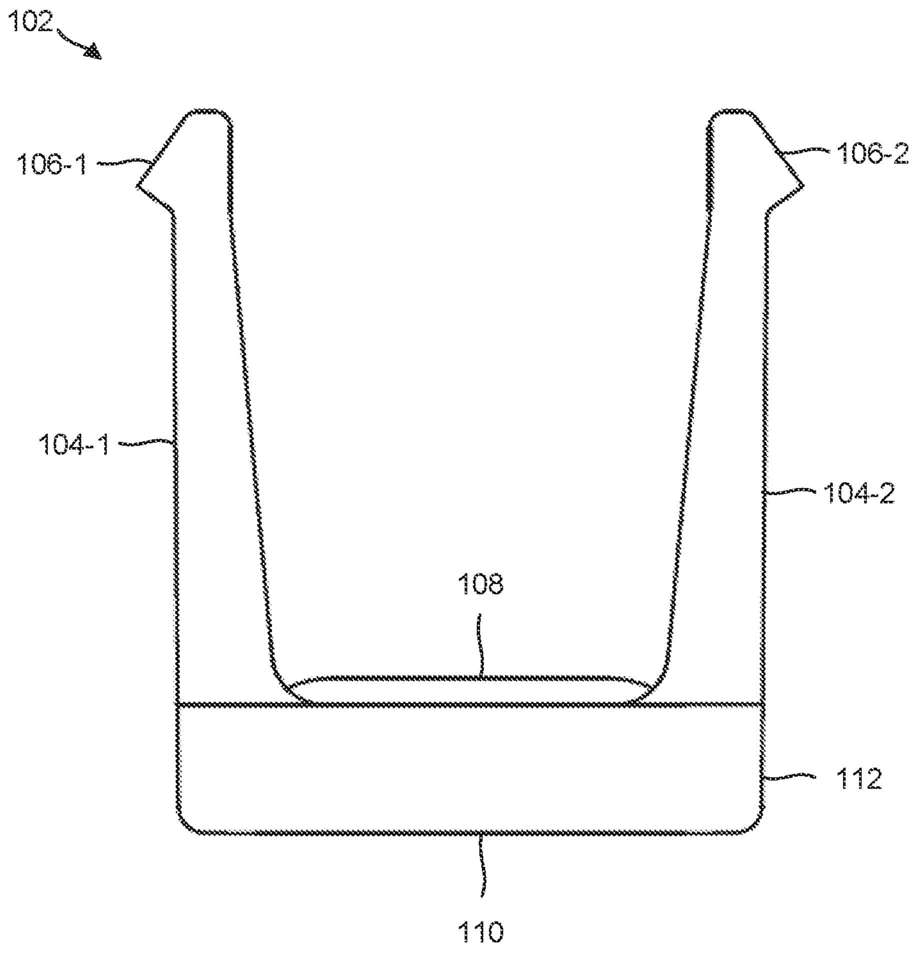
FIG. 3 illustrates a side view of a moveable clamp according to an example of the principles described herein.
Figure 4:
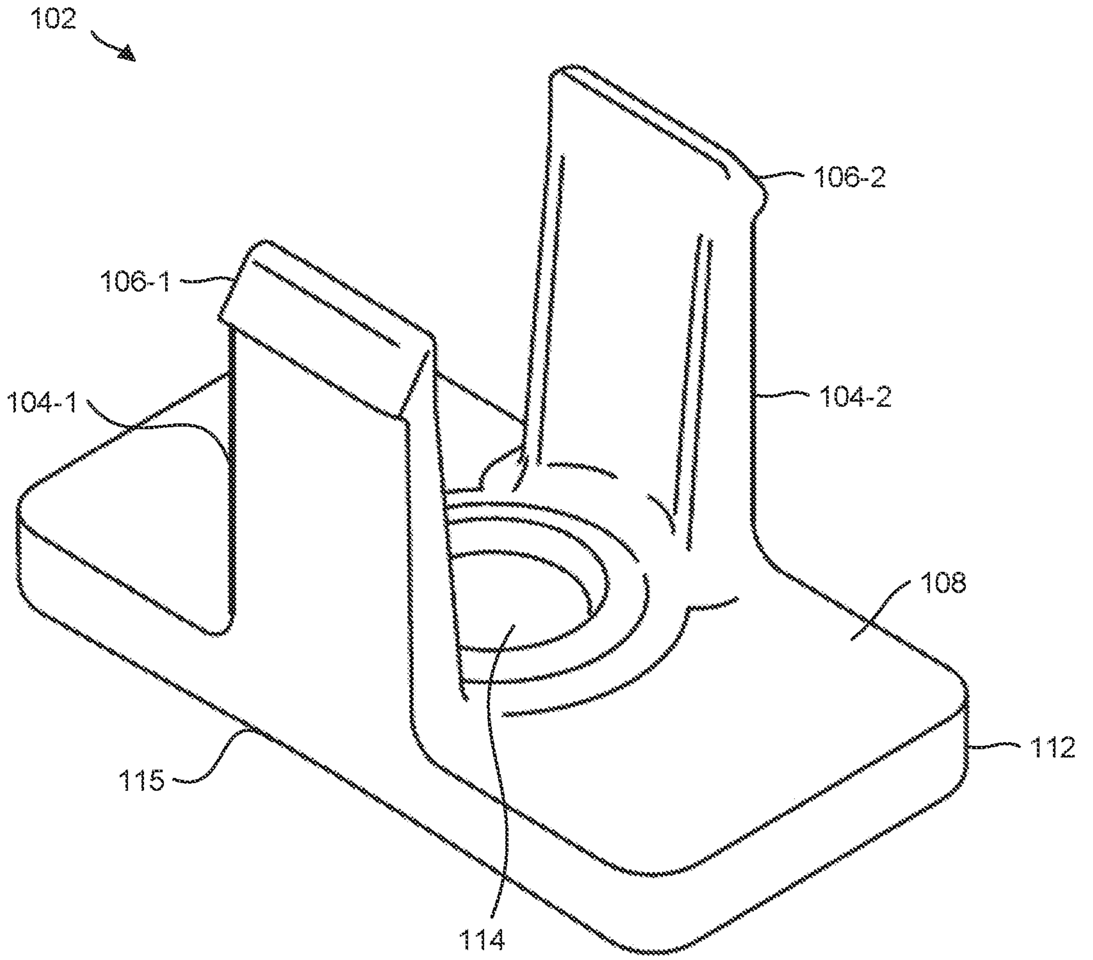
FIG. 4 illustrates a perspective view of a moveable clamp according to an example of the principles described herein.
Figure 5:
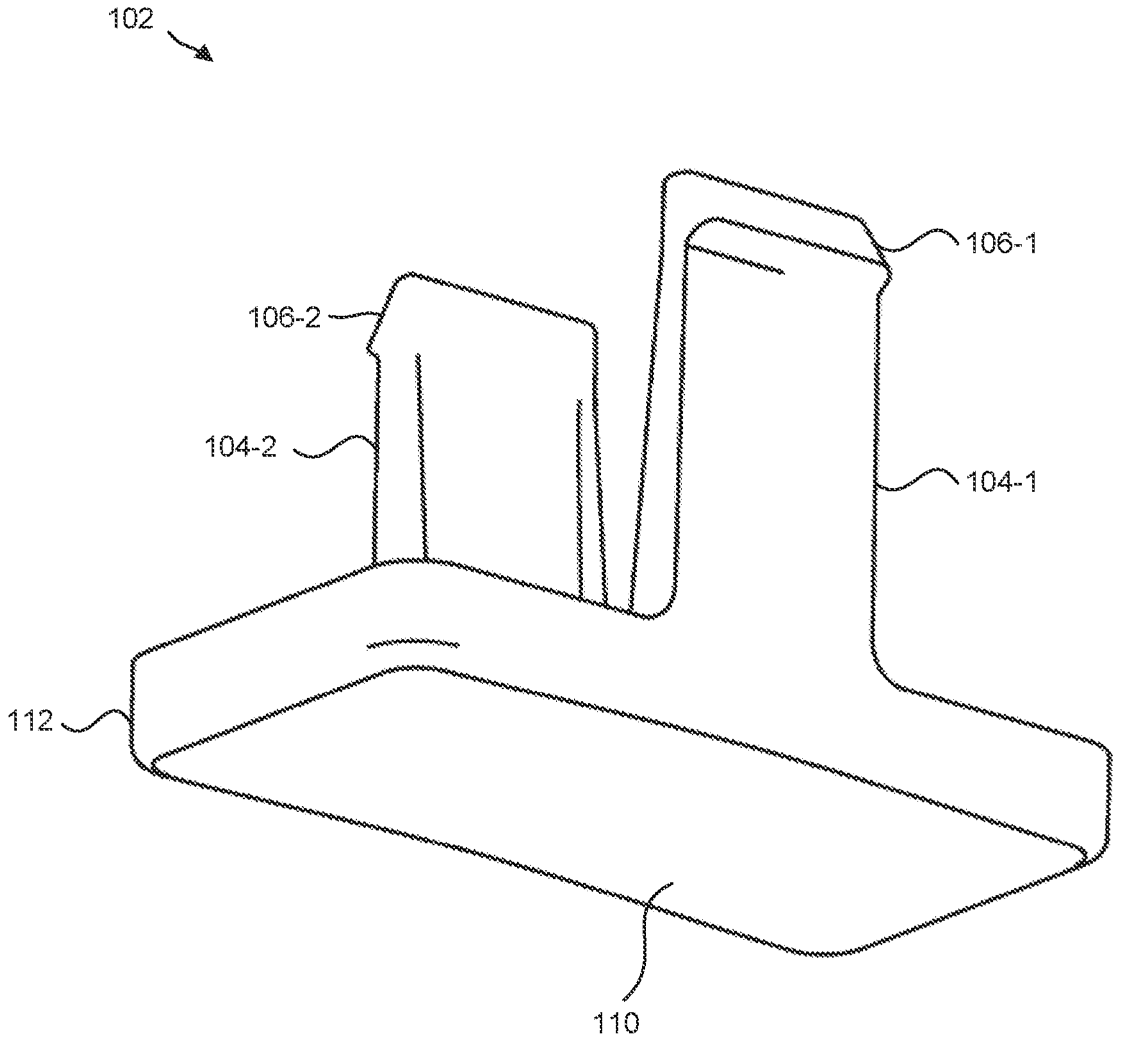
FIG. 5 illustrates another perspective view of a moveable clamp according to an example of the principles described herein.
Figure 6:
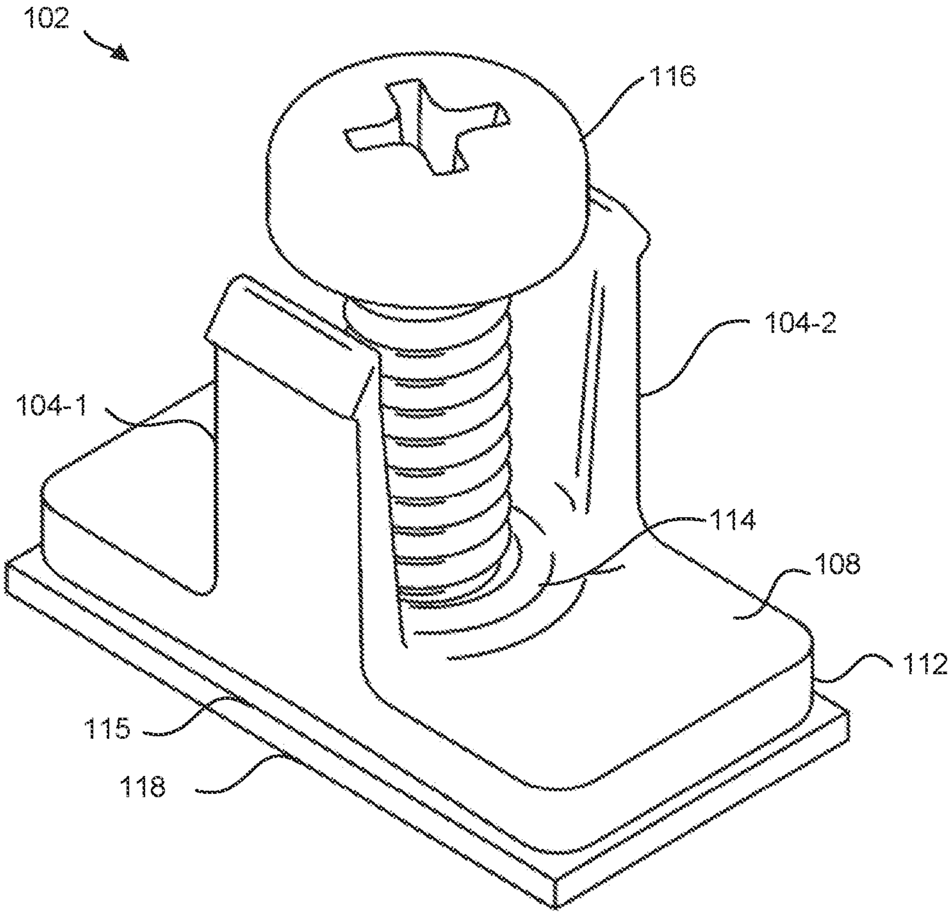
FIG. 6 illustrates a perspective view of a moveable clamp, adhesive pad, and a locking member according to an example of the principles described herein.
Figure 7:
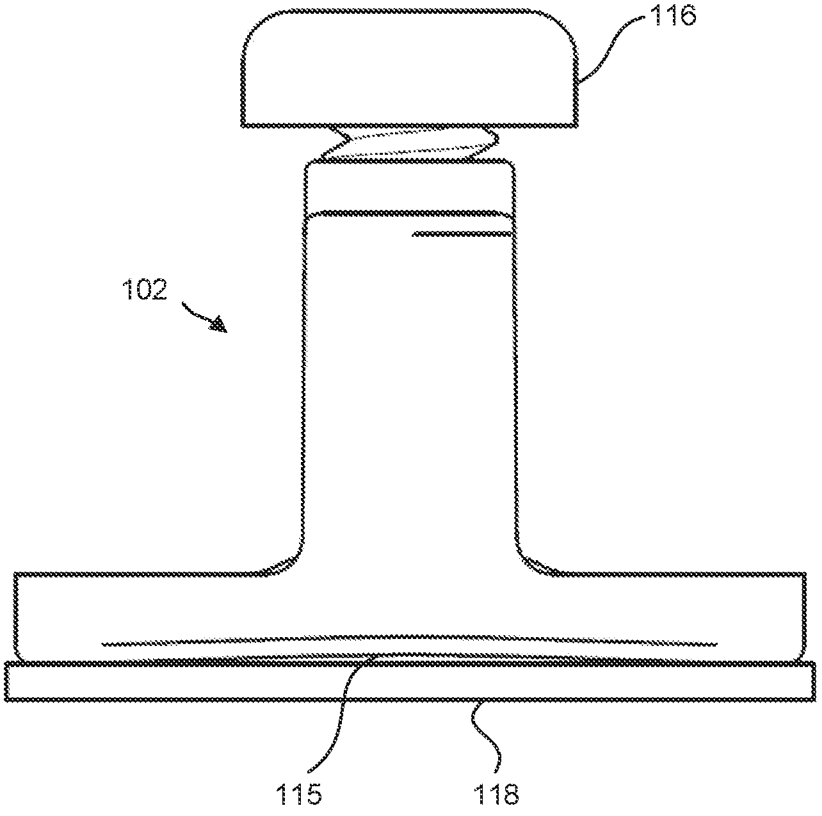
FIG. 7 illustrates a side view of a moveable clamp, adhesive tape, and a locking member according to an example of the principles described herein.

Turning to FIGS. 1 and 2, various views of a glass panel assembly 100 are shown, according to an example of principles described herein. The glass panel assembly 100 includes glass panel 200. In this example, a first horizontal frame structure 302-1 is positioned along a first horizontal side (e.g., a top side) of the glass panel 200 and a second horizontal frame structure 302-2 is positioned along a second horizontal side e.g., a bottom side) of the glass panel 200, A first vertical frame structure 402-1 is positioned along a first vertical side of the glass panel 200 and a second vertical frame structure 402-2 is positioned along a second vertical side of the glass panel 200.

The glass panel assembly 100 also includes glass adjustment assemblies 101-1, 101-2, 101-3, and 101-4. The first glass adjustment assembly 101-1 is positioned at a first corner of the glass panel assembly 100, the second glass adjustment assembly 101-2 is positioned at a second corner of the glass panel assembly 100, the third glass adjustment assembly 101-3 is positioned at a third corner of the glass panel assembly 100, and the fourth glass adjustment assembly 101-4 is positioned at a fourth corner of the glass panel assembly 100. It should be noted that in the views of FIGS. 1-2, the glass adjustment assemblies 101-1, 101-2, 101-3, and 101-4 are located within the horizontal frame structures 302-1, 302-2, and the vertical frame structures 402-1, 402-2, As such, the glass adjustment assemblies 101-1, 101-2, 101-3, and 101-4 may be hidden from view from the exterior of the glass panel assembly 100.

The glass adjustment assemblies 101-1, 101-2, 101-3, 101-4 may be used to secure a horizontal frame structure to a vertical frame structure at the corner of the glass panel assembly 100. Examples of the horizontal and vertical frame structures include extruded structural members. The glass adjustment assemblies 101-1, 101-2, 101-3, and 101-4 may be further used to secure the glass panel 200 into the frame structures (e.g., 302-1, 302-2, 402-1, 402-2) to add rigidity and eliminate sag within the glass panel assembly 100. Examples of various components of the glass adjustment assemblies 101-1, 101-2, 101-3, and 101-4 are now described, FIGS. 3-7 illustrate views of a clamp 102 and a locking member 116 for a glass adjustment assembly 101. The clamp 102 includes a base member 112 and side extensions 104-1 and 104-2 on either side of the base member 112. The base member 112 may be defined by a top surface 108 and a bottom surface 110. The side extensions 104-1 and 104-2 may extend from the sides of the top surface 108, In some examples, the side extensions 104-1 and 104-2 may terminate in projections 106-1 and 106-2, respectively. In some examples, the projections 106-1 and 106-2 may be barbs. The projections 106-1 and 106-2 may interface with a horizontal connection member (not shown) to facilitate retention of the clamp 102 on the horizontal connection member as described below.

In some examples, the locking member 116 may be a screw or other threaded fastener. The threads of the locking member 116 may be sized to corresponding threads of a threaded opening on the horizontal connection member, as described in FIG. 11. In some examples, the locking member 116 may include a torque-limiting feature to avoid damaging the glass panel 200, as described in FIG. 11.

In some examples, the clamp 102 includes a receiving structure 114 to receive the locking member 116. For example, the receiving structure 114 may include a projection and/or an indentation in the top surface 108 sized to receive the locking member 116. The receiving structure 114 may retain and position the locking member 116 as the locking member 116 contacts the clamp 102.

In some examples, as seen in FIGS. 4-7, the base member 112 of the clamp 102 may include a curved bottom surface 110. The curve 115 of the bottom surface 110 may apply a bias force to the glass panel 200 in response to pressure applied on the base member 112 by the locking member 116. As the locking member 116 is adjusted (e.g., tightened) to apply pressure on the base member 112, the curved bottom surface 110 may deflect. In some examples, the curved bottom surface 110 of the base member 112 may form a concave bowl. In other examples, the curve 115 may form an arch on the bottom surface 110. In some examples, when fully adjusted, the curved bottom surface 110 of the locking member 116 may deform to be flat, lying parallel to the edge of the glass panel 200.

In some examples, the glass adjustment assembly 101 includes an adhesive tape 118 that is to be positioned between the clamp 102 and the glass panel 200. The adhesive tape 118 may facilitate the clamp 102 gripping the glass panel 200. Furthermore, the adhesive tape 118 may distribute pressure applied by the clamp 102 to the glass panel 200. In some examples, the adhesive tape 118 may be adhered to the bottom surface 110 of the clamp 102 to aid in positioning of the clamp 102 on the glass panel 200.

Figure 8:
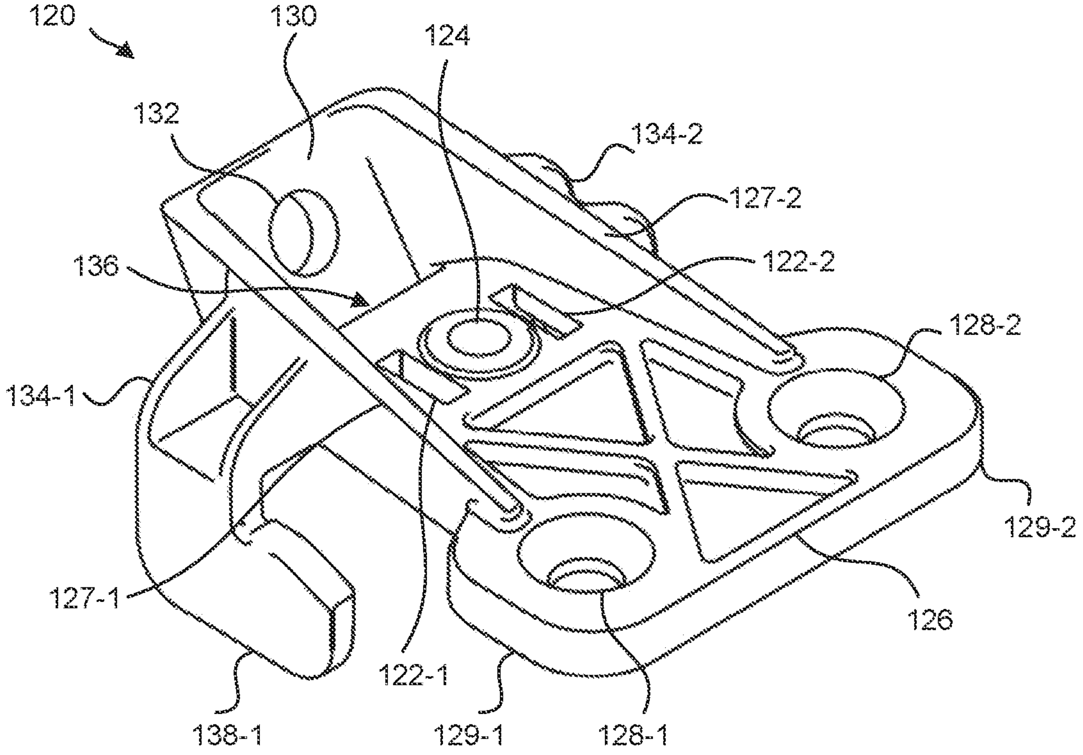
FIG. 8 illustrates a perspective view of a horizontal connection member according to an example of the principles described herein.
Figure 9:
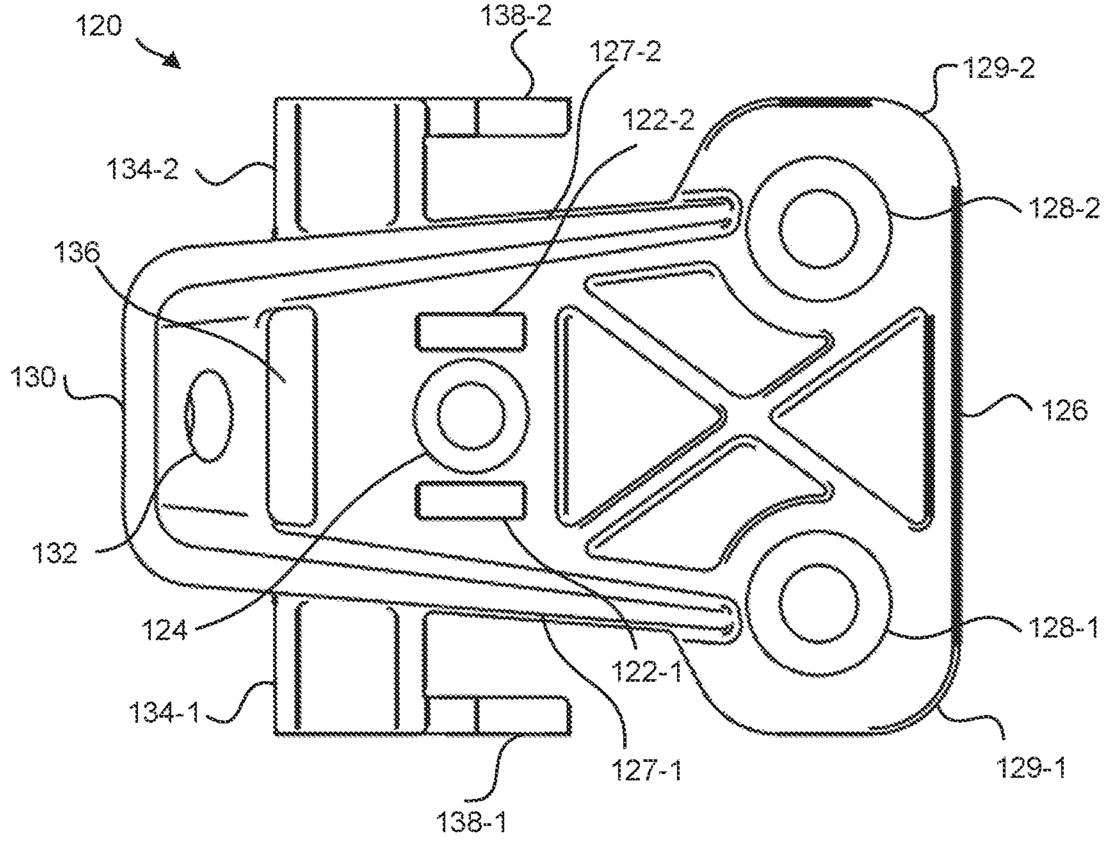
FIG. 9 illustrates a top view of a horizontal connection member according to an example of the principles described herein.
Figure 10:
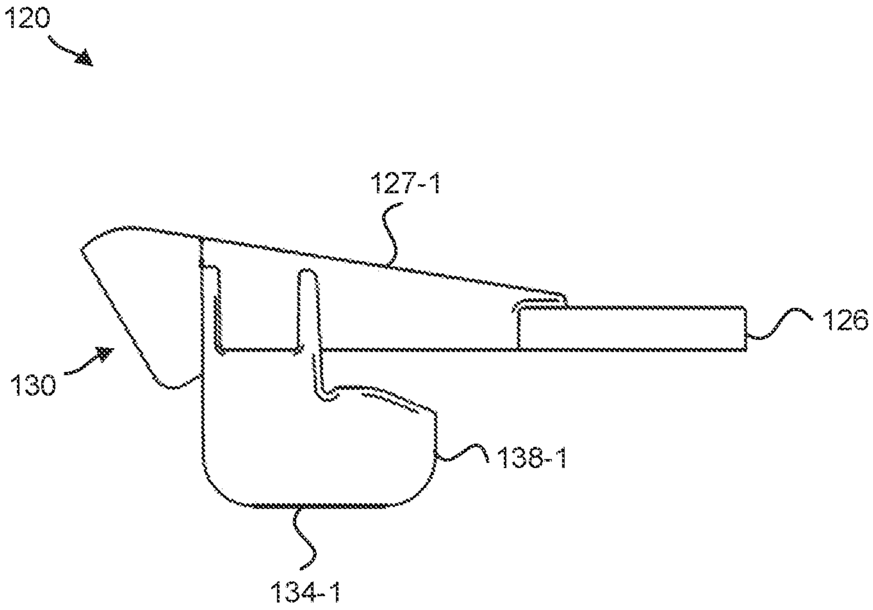
FIG. 10 illustrates a side view of a horizontal connection member according to an example of the principles described herein.

FIGS. 8-10 illustrate views of a horizontal connection member 120. In some examples, the horizontal connection member 120 includes a base 126 with side walls 127-1 and 127-2 projecting from the base 126. In the example depicted in FIGS. 8-10 the side walls 127-1 and 127-2 taper from a first end to a second end. In other examples, the side walls 127-1 and 127-2 may be formed without a taper.

Figure 11:
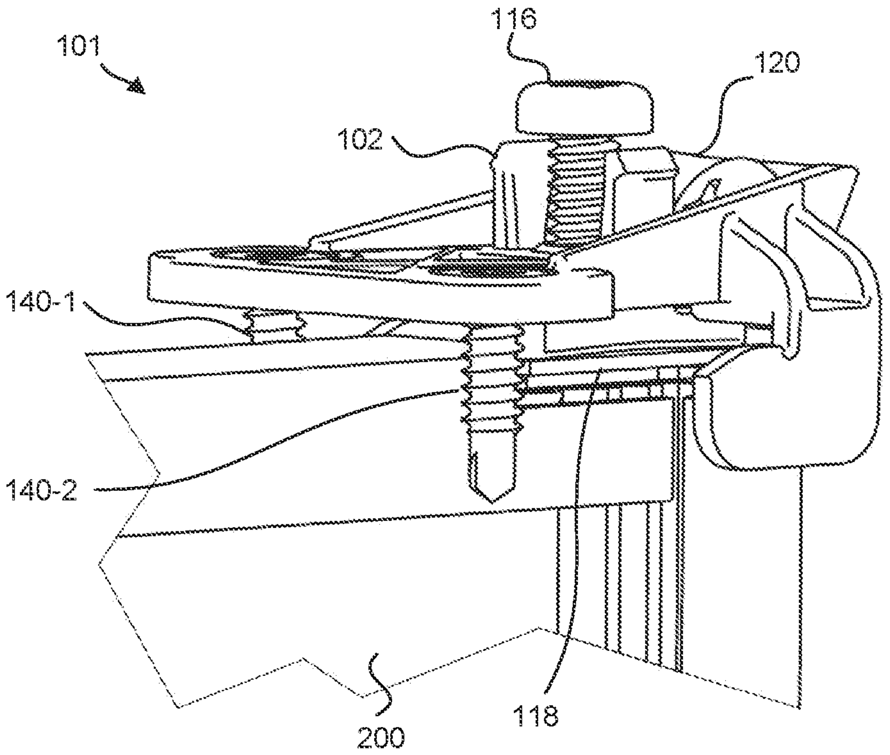
FIG. 11 illustrates perspective view of a glass adjustment assembly according to an example of the principles described herein.

The horizontal connection member 120 includes openings 122-1 and 122-2 to receive the side extensions 104-1 and 104-2 of the clamp 102. The openings 122-1 and 122-2 may be sized to allow the side extensions 104-1 and 104-2 of the clamp 102 to be slidably mounted to the horizontal connection member 120. In this example, the openings 122-1 and 122-2 have a rectangular profile corresponding to the rectangular shape of the side extensions 104-1 and 104-2. The openings 122-1 and 122-2 enable linear movement (e.g., vertical) of the clamp 102 in response to variable attachment of the locking member. An example of this motion is depicted in FIG. 11.

The horizontal connection member 120 includes threaded opening 124 to receive the locking member 116. The threaded opening 124 may hold the locking member 116 approximately perpendicular to the base 126 of the horizontal connection member 120. In an example where the locking member 116 is a screw, the threaded opening 124 may receive the threads of the screw. Thus, as the locking member 116 is turned in a first direction, the locking member 116 may extend through the base 126. As the locking member 116 is turned in a second direction, the locking member 116 may retract out of the horizontal connection member 120.

In some examples, the horizontal connection member 120 includes holes 128-1 and 128-2 to receive fasteners to attach the horizontal connection member 120 to a horizontal frame structure. In this example, the holes 128-1 and 128-2 are unthreaded and include a chamfer to receive the head of a fastener.

Figure 13:
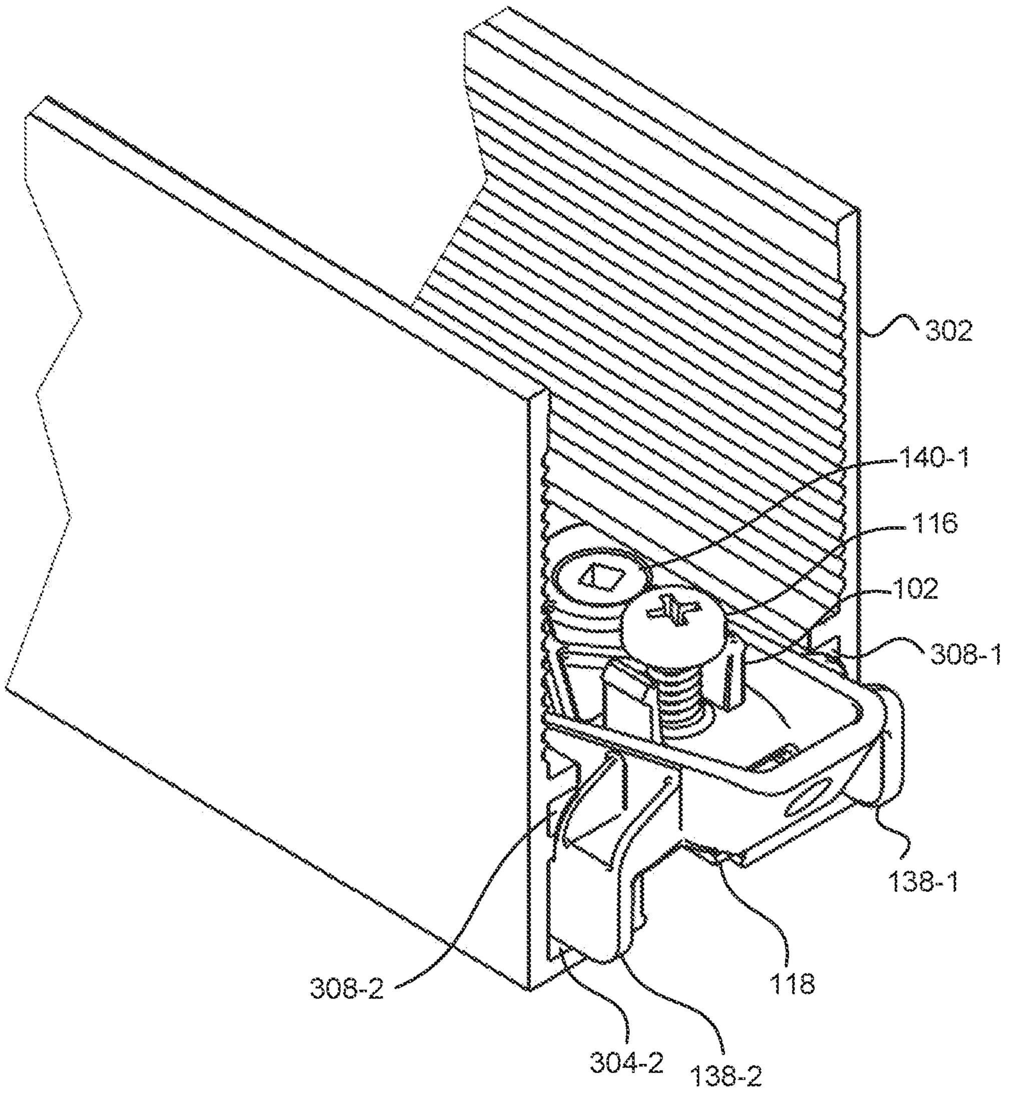
FIG. 13 illustrates a perspective view of a horizontal frame structure and a glass adjustment assembly according to an example of the principles described herein.

In some examples, the base 126 of the horizontal connection member 120 includes projections 129-1 and 129-2 to slide within channels of a horizontal frame structure. FIG. 13 illustrates an example of the projections 129-1 and 129-2 being placed in channels of a horizontal frame structure.

In some examples, the horizontal connection member 120 includes a pair of arms 134-1 and 134-2 projecting from the side walls 127-1 and 127-2 and a portion of the base 126. Each of the arms 134-1 and 134-2 may terminate in tabs 138-1 and 138-2. The tabs 138-1 and 138-2 may be oriented perpendicular to the arms 134-1 and 134-2. The tabs 138-1 and 138-2 may be sized and positioned to be inserted into a pair of cavities in the end of the horizontal frame structure, as illustrated in FIG. 13.

Figure 22:
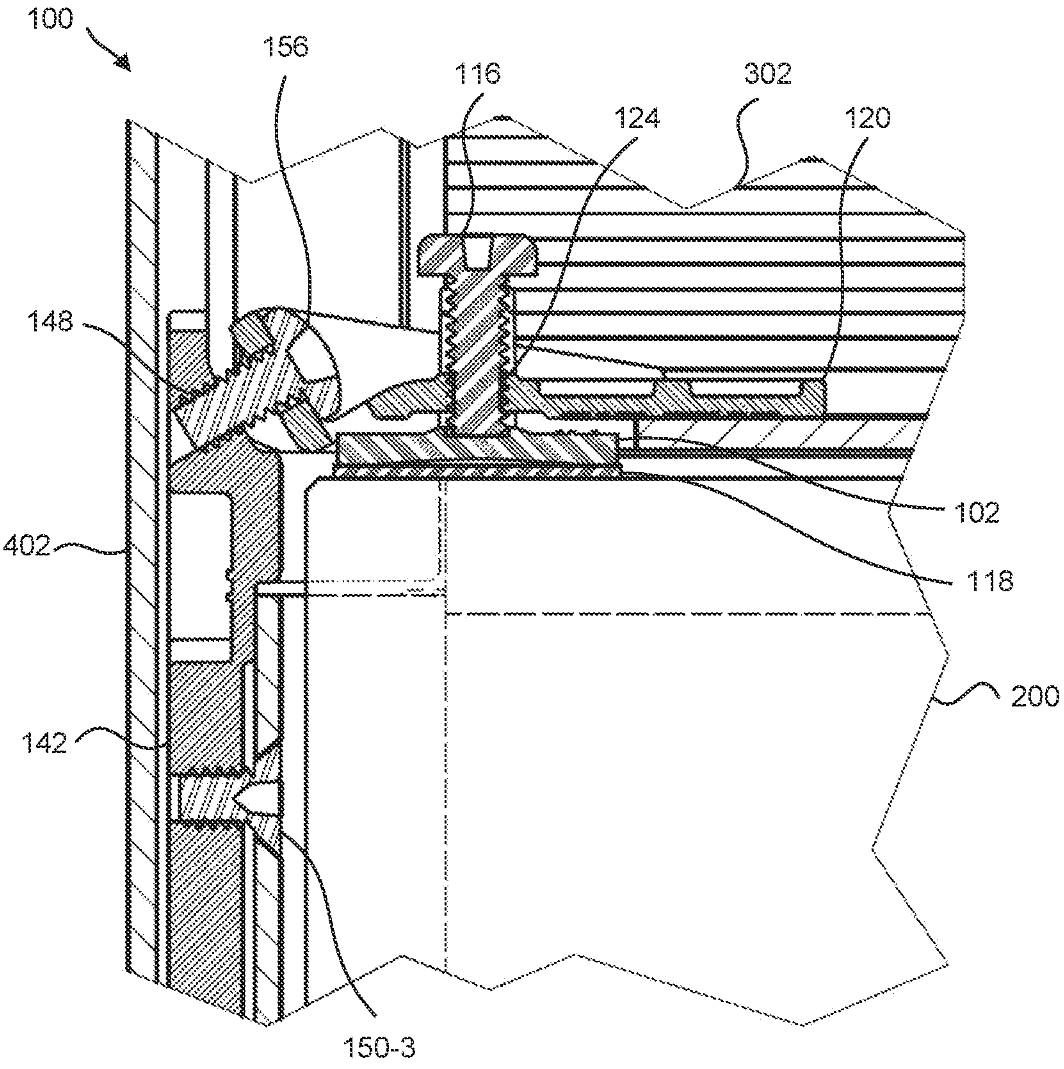
FIG. 22 illustrates a front section view of a glass panel assembly according to an example of the principles described herein.

The horizontal connection member 120 includes an angled cinching wall 130 located between the side walls 127-1 and 127-2. The angled cinching wall 130 may include an unthreaded opening 132 to allow passage to a portion of a cinching member. A second portion of the cinching member may interface with (e.g., bear against) the angled cinching wall 130. The angled cinching wall 130 and unthreaded opening 132 may allow the cinching member to attach the horizontal connection member 120 to a vertical connection member (not shown) to a variable degree, as illustrated in FIG. 22. In some examples, the horizontal connection member 120 includes a gap 136 between the base 126 and the angled cinching wall 130. The gap 136 may facilitate placement of the clamp 102 when assembled with the horizontal connection member 120.

FIG. 11 illustrates a perspective view of the glass adjustment assembly 101 according to an example. The side extensions 104-1 and 104-2 of the clamp 102 are slidably mounted to the horizontal connection member 120. For example, the side extensions 104-1 and 104-2 may be inserted through the openings 122-1 and 122-2 of the horizontal connection member 120. The side extensions 104-1 and 104-2 of the clamp 102 may move vertically in relation to the horizontal connection member 120. The clamp 102 provides a mounting connection to a glass panel 200. As seen in this example, the glass adjustment assembly 101 includes adhesive tape 118 positioned between the clamp 102 and the glass panel 200.

The locking member 116 is variably attached to the horizontal connection member 120. For example, the threads of the locking member 116 may interface with the threaded opening 124 of the horizontal connection member 120. As the locking member 116 is turned, the position of the locking member 116 changes with reference to the horizontal connection member 120. The variable attachment of the locking member 116 applies a controlled pressure on the base member 112 of the clamp 102. The pressure from the locking member 116 is transmitted from the clamp 102 to a glass panel 200, The locking member 116 may provide the controlled pressure to the clamp 102 to limit the pressure applied to the glass panel 200.

In some examples, the locking member 116 may be designed to fail at a threshold stress before pressure that would damage the glass panel 200 can be applied. For example, the locking member 116 may be formed from a material (e.g., polymer) and with a structure that fails under a given torque. Thus, as the locking member 116 is being tightened, the locking member 116 may fail (e.g., fracture) before a compressive force is applied to the glass panel 200 that would damage the glass panel 200.

Figure 12:
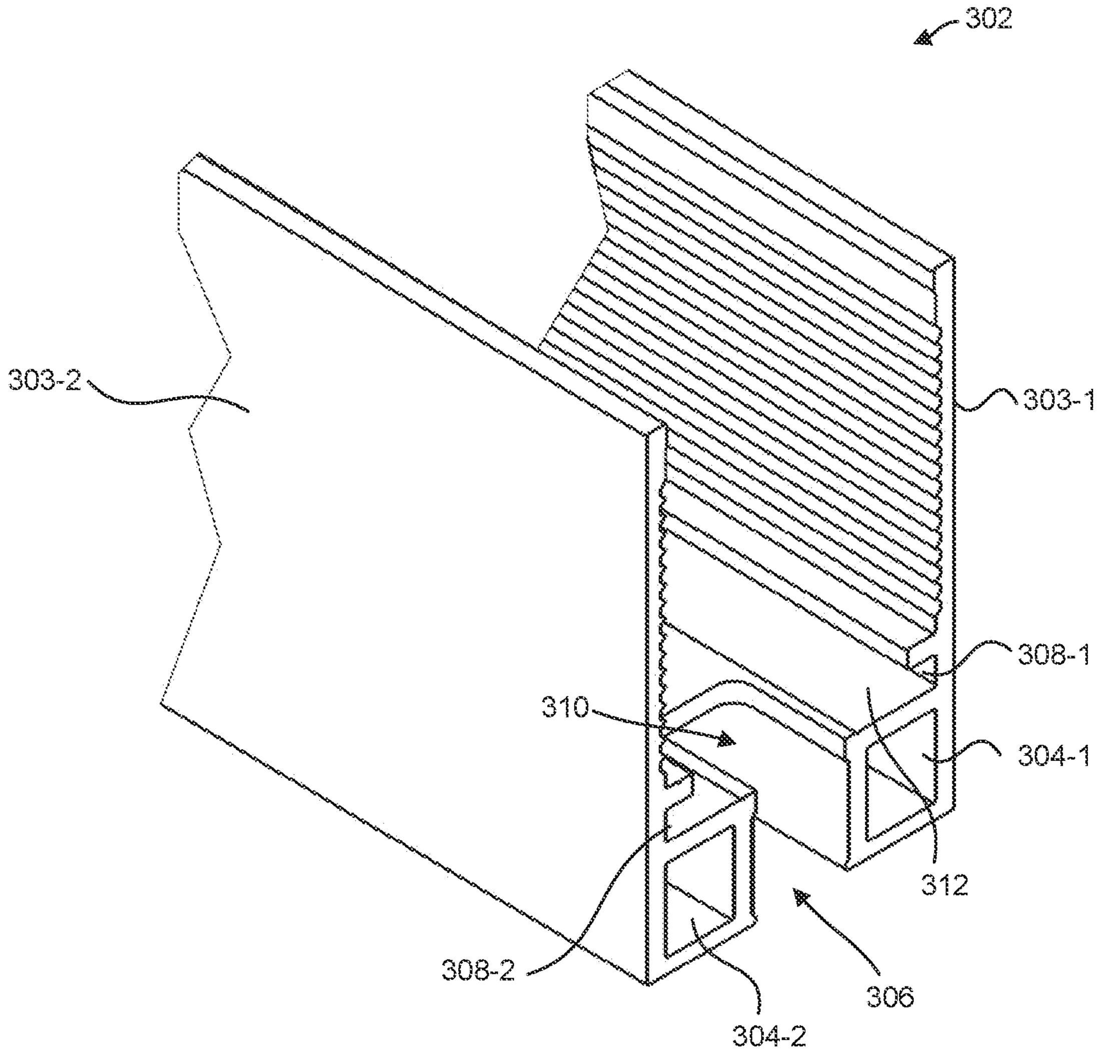
FIG. 12 illustrates a perspective view of a horizontal frame structure according to an example of the principles described herein.

FIGS. 12 and 13 illustrate views of a horizontal frame structure 302 according to an example. The horizontal frame structure 302 may be formed as an extruded material. In some examples, the horizontal frame structure 302 has two side walls 303-1 and 303-2 located between a central surface 312.

The horizontal connection member 120 attaches to an end of the horizontal frame structure 302. A pair of cavities 304-1 and 304-2 may be formed to receive the tabs 138-1 and 138-2 of the horizontal connection member 120, respectively. The interaction of the tabs 138-1 and 138-2 on the upper surfaces of the cavities 304-1 and 304-2 may resist movement (e.g., rotation) of the horizontal connection member 120 when pressure is applied to the glass panel 200 via the clamp 102 and locking member 116. The space between the cavities 304-1 and 304-2 may form a glass panel channel 306 in which a side of the glass panel 200 is housed when in an assembled configuration.

In some examples, the horizontal frame structure 302 may include channels 308-1 and 308-2 to receive the projections 129-1 and 129-2 of the horizontal connection member 120. The channels 308-1 and 308-2 provide surfaces to constrain the horizontal connection member 120 when installing the horizontal connection member 120 on the horizontal frame structure 302. The channels 308-1 and 308-2 also provide surfaces to constrain the horizontal connection member 120 when pressure is applied to the glass panel 200 via the clamp 102 and locking member 116.

The end of the horizontal frame structure 302 may include an opening 310 on the surface 312. The opening 310 may allow the clamp 102 and/or adhesive tape 118 to contact the glass panel 200 when the horizontal connection member 120 is installed on the horizontal frame structure 302.

In some examples, fasteners 140-1 and 140-2 attach the horizontal connection member 120 to the horizontal frame structure 302. For example, a first fastener 140-1 located at the first hole 128-1 of the horizontal connection member 120 may pass through the surface 312 into the first cavity 304-1 of the horizontal frame structure 302. A second fastener 140-2 located at the second hole 128-2 of the horizontal connection member 120 may pass through the surface 312 into the second cavity 304-2 of the horizontal frame structure 302. Some examples of different implementations of the horizontal connection member 120 are described in FIG. 24.

Figure 14:
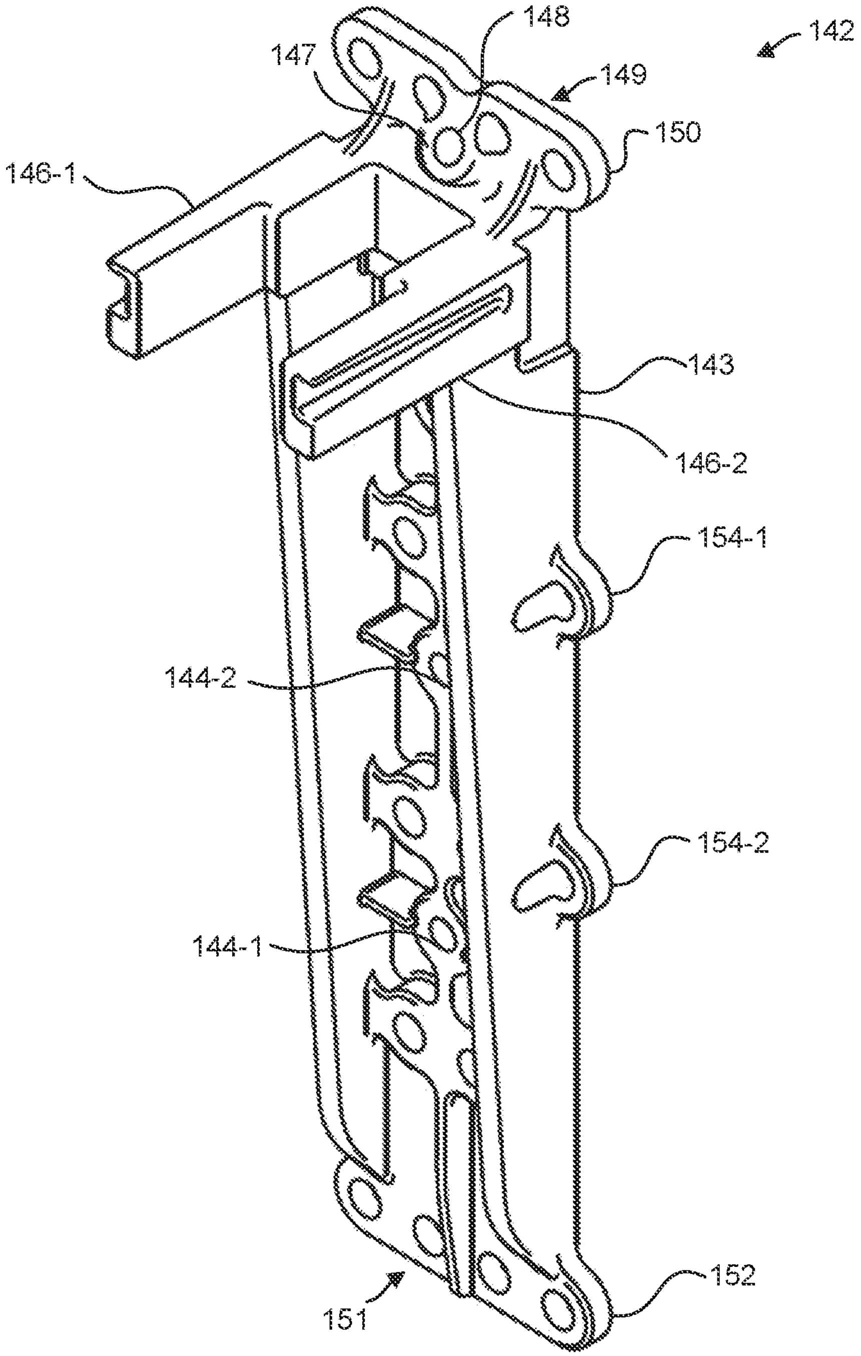
FIG. 14 illustrates a perspective view of a vertical connection member according to an example of the principles described herein.
Figure 15:
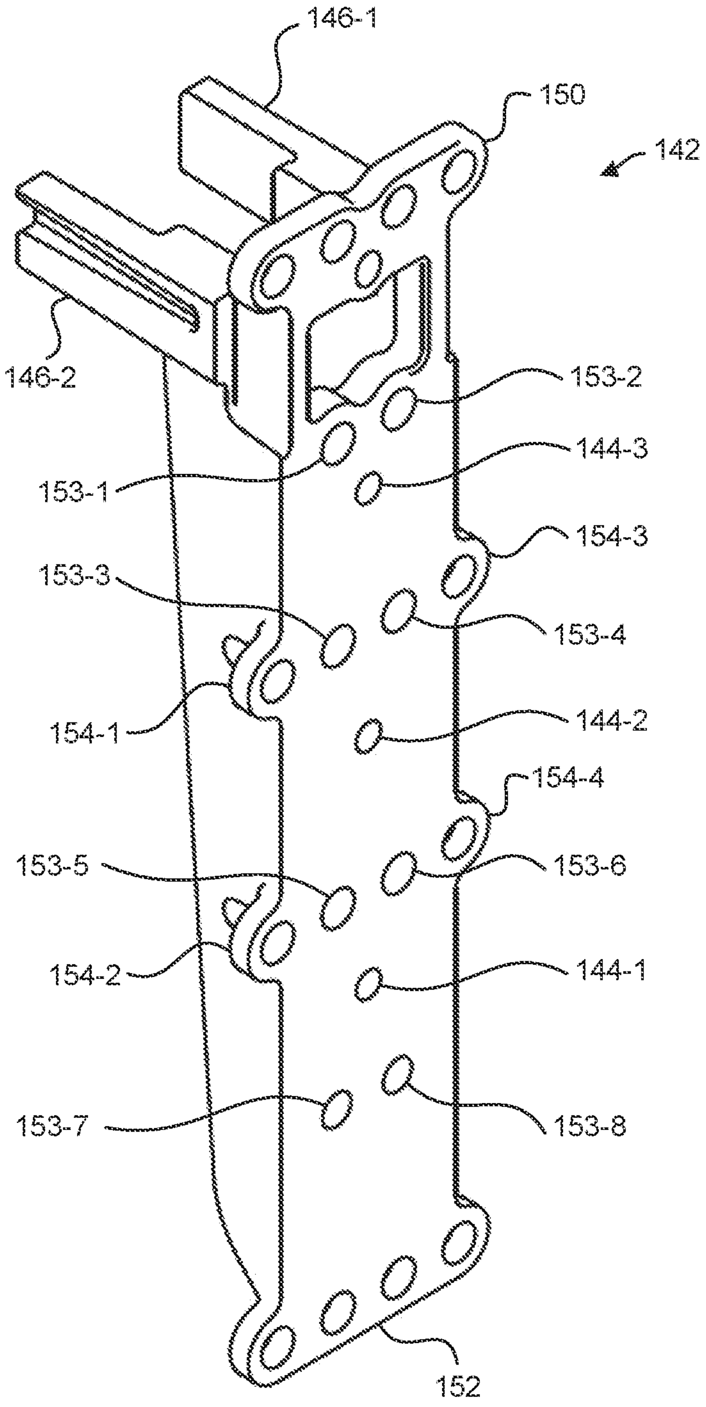
FIG. 15 illustrates another perspective view of a vertical connection member according to an example of the principles described herein.
Figure 17:
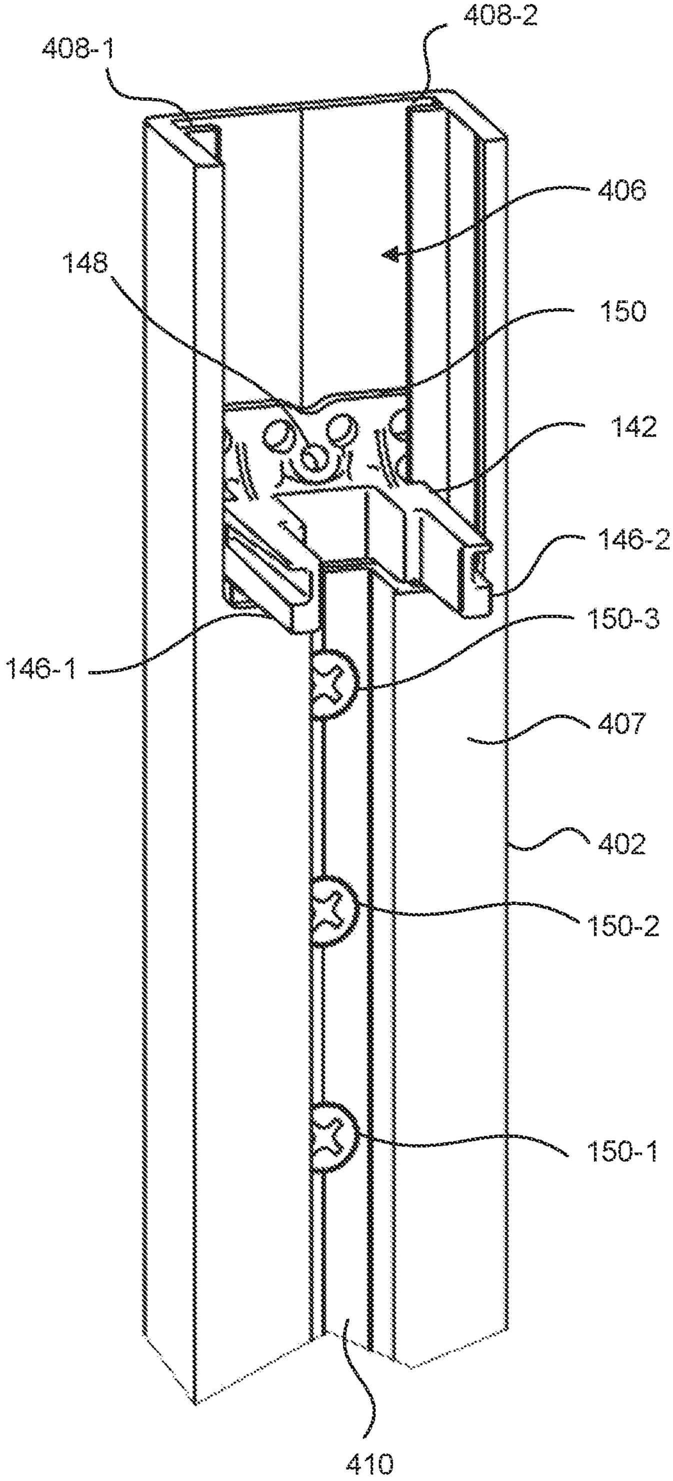
FIG. 17 illustrates a perspective view of a vertical frame structure and a vertical connection member according to an example of the principles described herein.

FIGS. 14 and 15 illustrate views of a vertical connection member 142 according to an example. The vertical connection member 142 is to attach to an end of a vertical frame structure (as shown in FIG. 17). The vertical connection member 142 may be defined by a central body 143 having a first end 149 and a second end 151. The body 143 may include a number of threaded holes (e.g., 144-1, 144-2, 144-3) to receive threaded fasteners to attach the vertical connection member 142 to the vertical frame structure.

The vertical connection member 142 may include projections 150 at a first end and projections 152 at a second end. The vertical connection member 142 may also include a number of side projections (e.g., 154-1, 154-2, 154-3, 154-4). The end projections 150, 152, and side projections 154-1, 154-2, 154-3, 154-4 may be sized to be received by channels in vertical frame structure (as shown in FIG. 17).

In some examples, the vertical connection member 142 includes a pair of arms 146-1 and 146-2 located at the first end 149 of the body 143. The arms 146-1 and 146-2 may be projections that extend out approximately perpendicular to the axis of the body 143. The arms 146-1 and 146-2 may be sized to fit within the cavities 304-1 and 304-2 of the horizontal frame structure 302 when in an assembled configuration.

The vertical connection member 142 includes a threaded opening 148 in an angled surface 147 located at the first end 149 of the vertical connection member 142, In some examples, the angle of the angled surface 147 matches the angle of the angled cinching wall 130 of the horizontal connection member 120. Thus, when in an assembled configuration, the plane of the angled surface 147 may be approximately aligned with the plane of the angled cinching wall 130. The threaded opening 148 may receive a screw of the cinching member through the unthreaded opening 132 of the horizontal connection member 120, as illustrated in FIGS. 18-23.

The vertical connection member 142 may include a number of unthreaded openings (e.g., 153-1, . . . , 153-8) that are configured to receive fasteners for mounting hardware (e.g., hinges, pivots, etc.) located external to the vertical frame structure 402. The unthreaded openings (e.g., 153-1, . . . , 153-8) may be of a size such that the fastener can deform the material comprising the openings (e.g., 153-1, . . . , 153-8), forming threads in the vertical connection member 142.

Figure 16:
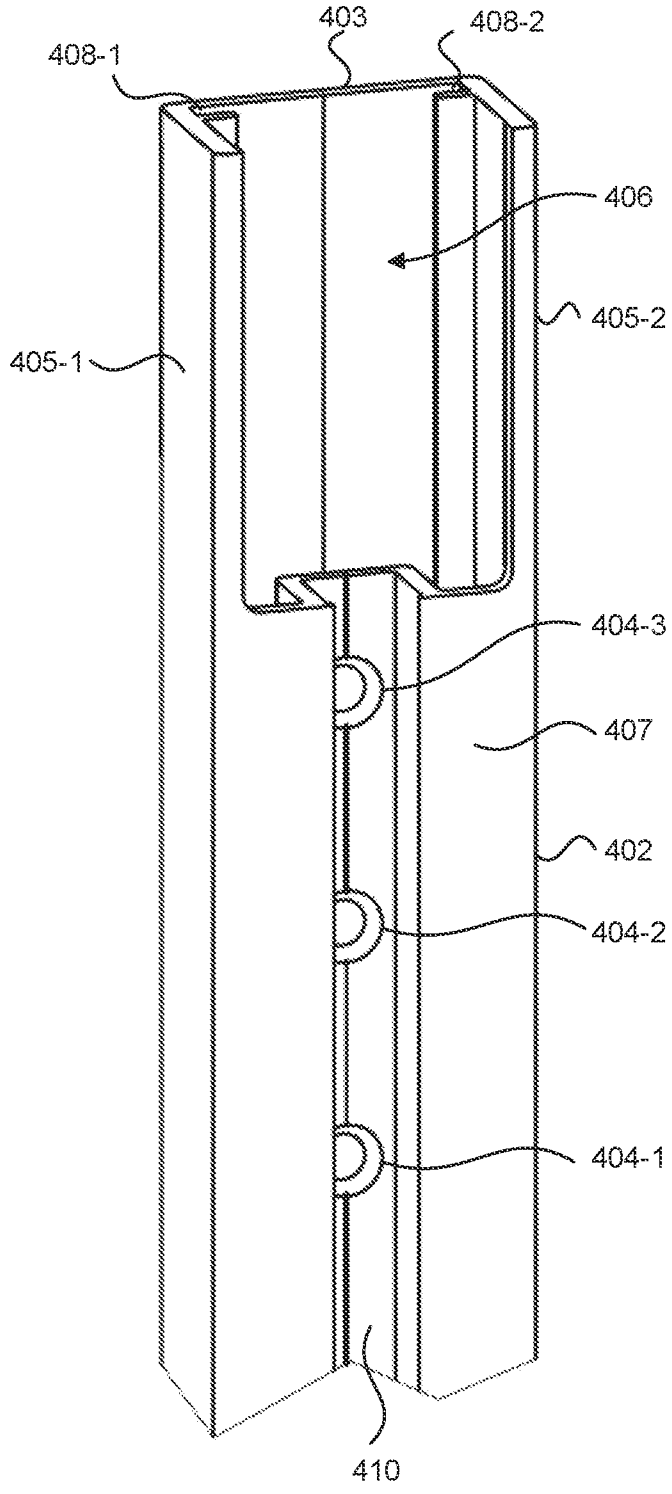
FIG. 16 illustrates perspective view of a vertical frame structure according to an example of the principles described herein.

FIGS. 16 and 17 illustrate perspective views of a vertical frame structure 402 according to an example. The vertical frame structure 402 may have a first end and a second end. When in an assembled configuration, the vertical frame structure 402 may be positioned along a vertical side of the glass panel 200.

In some examples, the vertical frame structure 402 may be formed as an extruded material. The vertical frame structure 402 has a back wall 403 and two side walls 405-1 and 405-2 extending from the back wall 403. A front wall 407 may span between the side walls 405-1 and 405-2, The front wall 407 may include a glass panel channel 410 in which a side of the glass panel 200 is housed when in an assembled configuration.

The vertical frame structure 402 includes an opening 406 in the front wall 407 at the first end of the vertical frame structure 402. The opening 406 may be sized to allow the vertical connection member 142 to be inserted a given distance from the first end of the vertical frame structure 402. The arms 146-1 and 146-2 of the vertical connection member 142 may project out of the opening 406.

The vertical frame structure 402 may include a number of holes 404-1, 404-2, 404-3. When the vertical connection member 142 is installed on the vertical frame structure 402, the holes 404-1, 404-2.404-3 align with the threaded holes 144-1, 144-2, 144-3 of the vertical connection member 142. Threaded fasteners 150-1, 150-2, and 150-3 may pass through the unthreaded holes 404-1, 404-2, 404-3 of the vertical frame structure 402 to connect to the threaded holes 144-1, 144-2, 144-3 of the vertical connection member 142.

Figure 18:
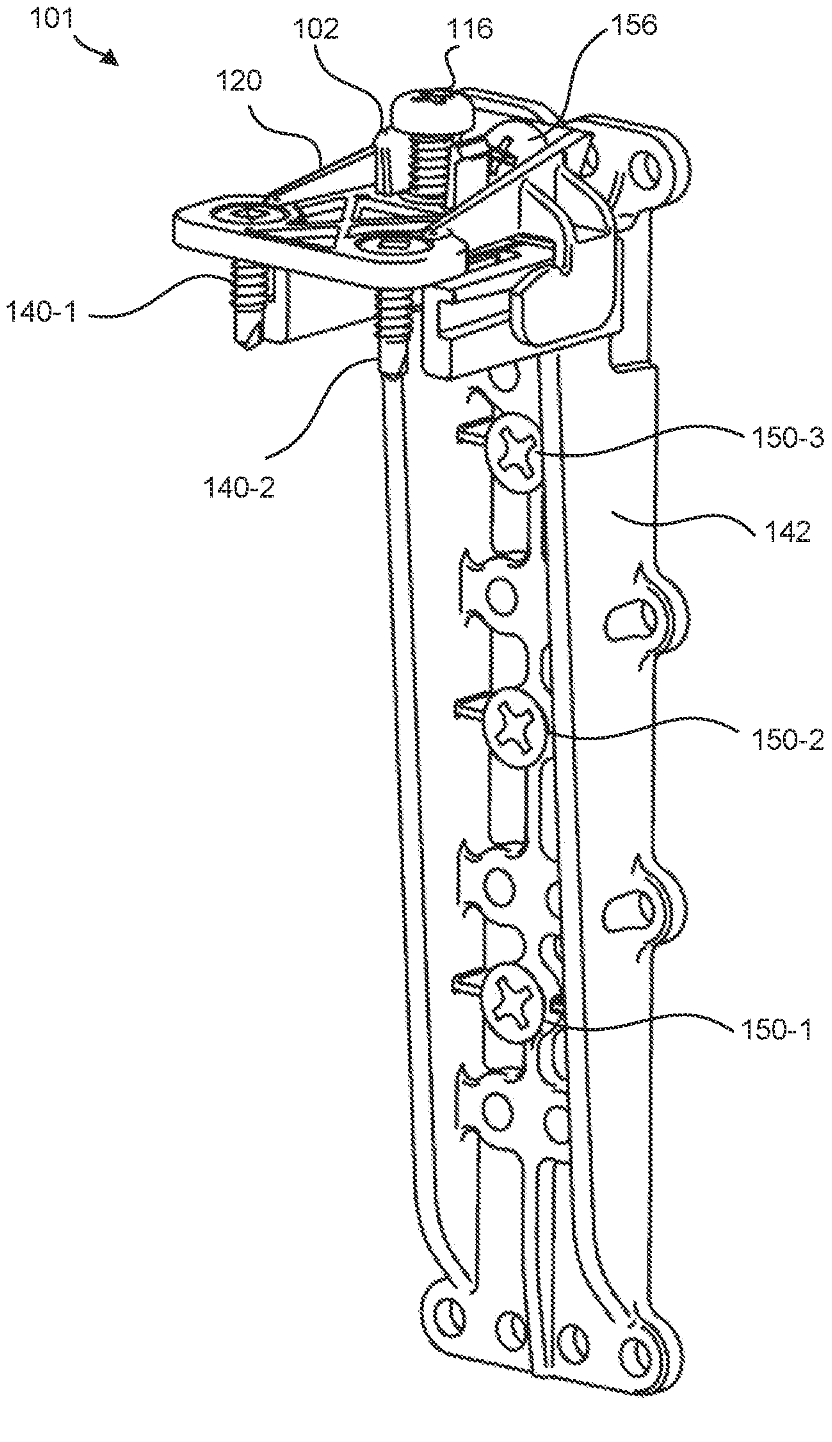
FIG. 18 illustrates a perspective view of a glass adjustment assembly according to an example of the principles described herein.
Figure 19:
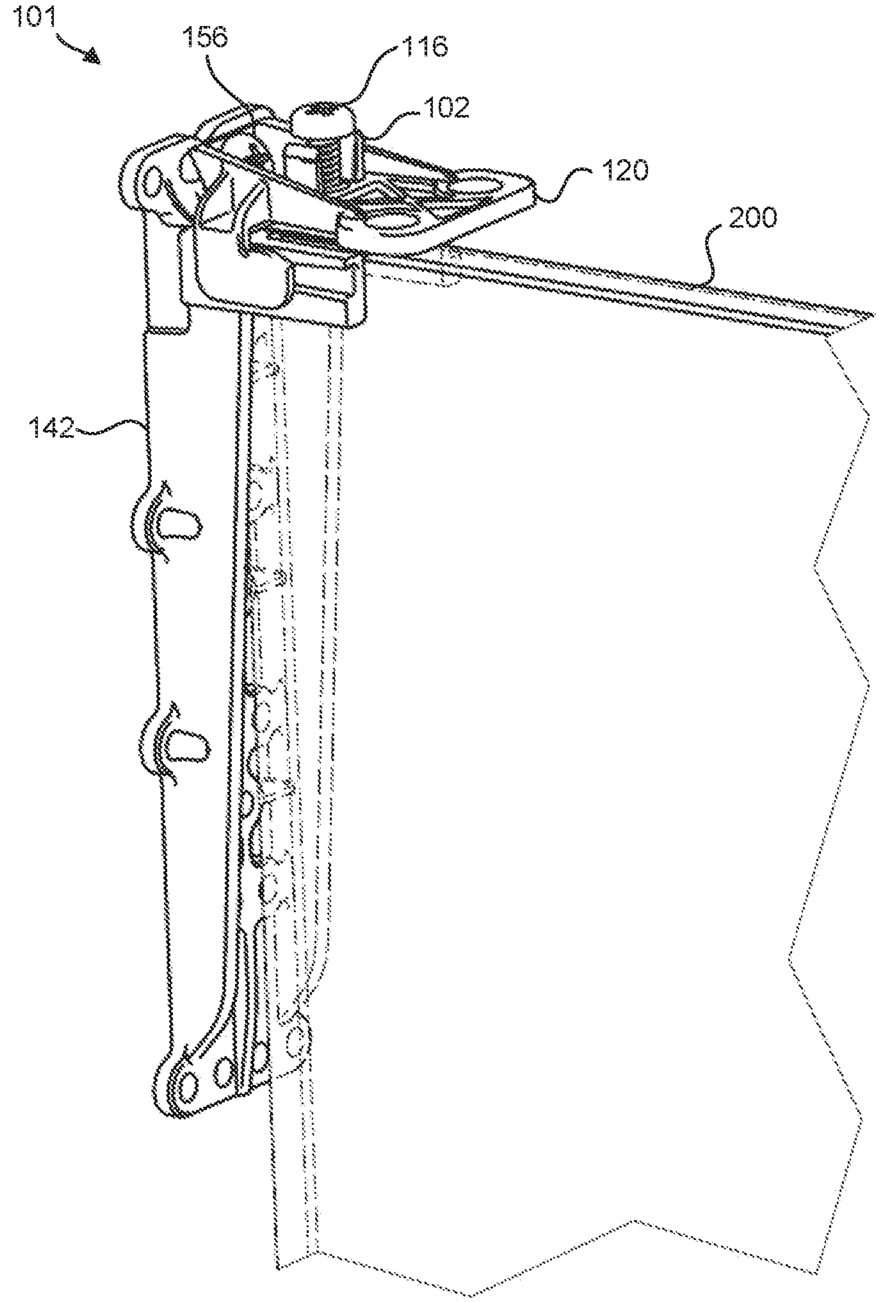
FIG. 19 illustrates a perspective view of a glass adjustment assembly and a glass panel according to an example of the principles described herein.
Figure 20:
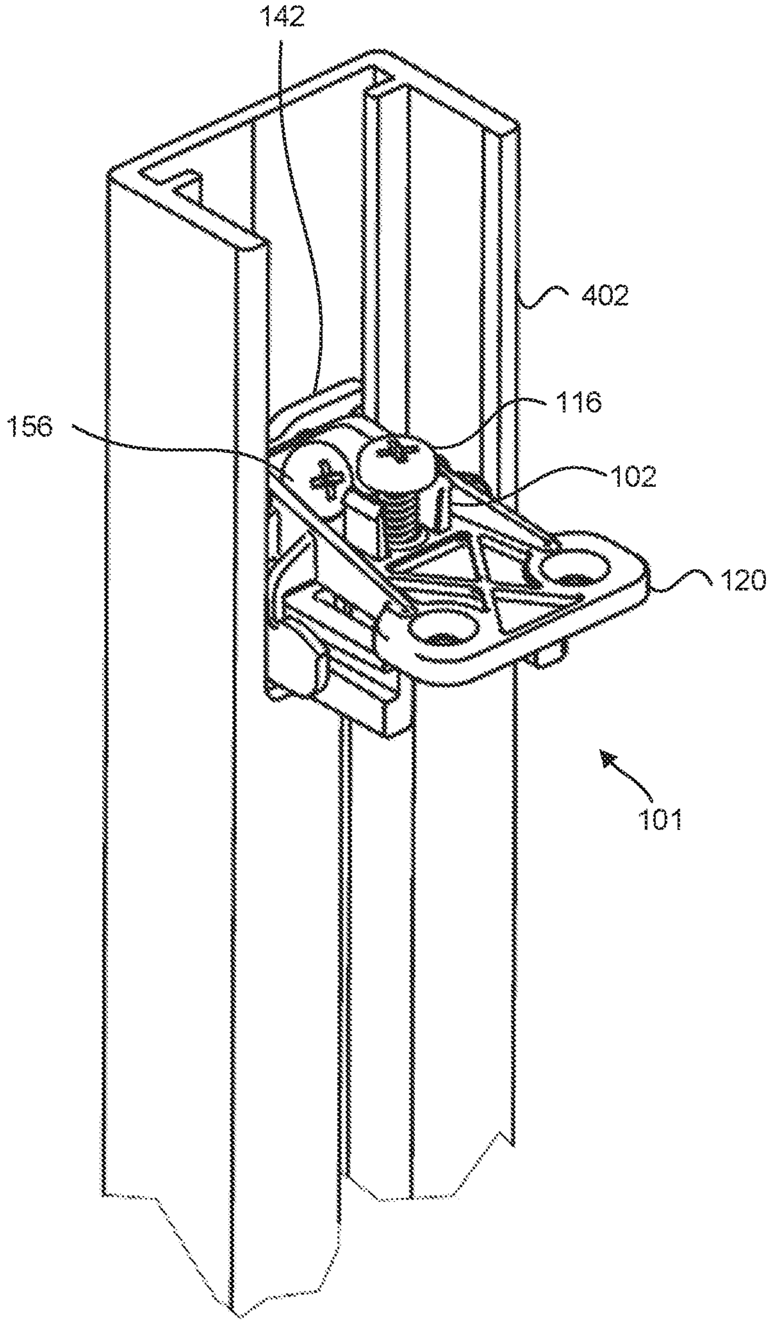
FIG. 20 illustrates a perspective view of a glass adjustment assembly and a vertical frame structure according to an example of the principles described herein.
Figure 21:
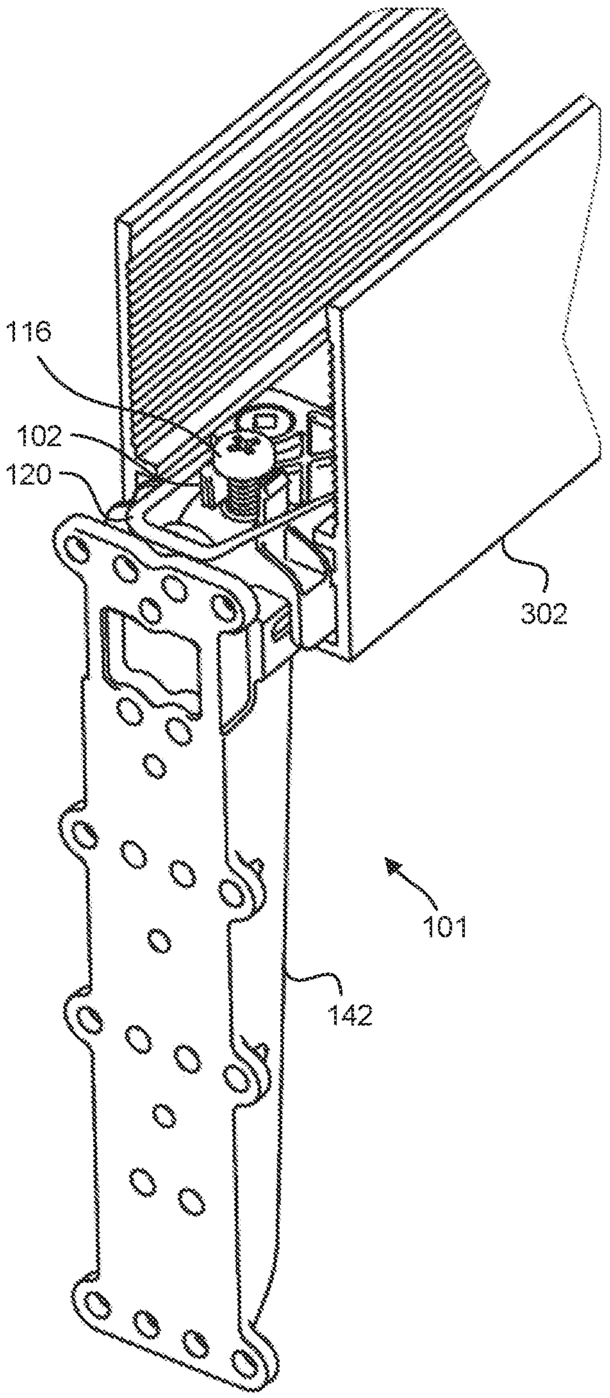
FIG. 21 illustrates a perspective view of a glass adjustment assembly and a horizontal frame structure according to an example of the principles described herein.

The vertical frame structure 402 may include channels 408-1 and 408-2. The channels 408-1 and 408-2 may receive the end projections 150, 152, and side projections 154-1, 154-2, 154-3, 154-4 of the vertical connection member 142 to facilitate installation and placement of the vertical connection member 142, FIGS. 18-23 illustrate views of the glass adjustment assembly 101 in an assembled configuration. For clarity, FIG. 18 illustrates the glass adjustment assembly 101 without depicting the glass panel 200, the horizontal frame structure 302 or the vertical frame structure 402. FIG. 19 illustrates the glass adjustment assembly 101 installed on the glass panel 200. FIG. 20 illustrates the glass adjustment assembly 101 installed on the vertical frame structure 402, FIG. 21 illustrates the glass adjustment assembly 101 installed on the horizontal frame structure 302.

Figure 23:
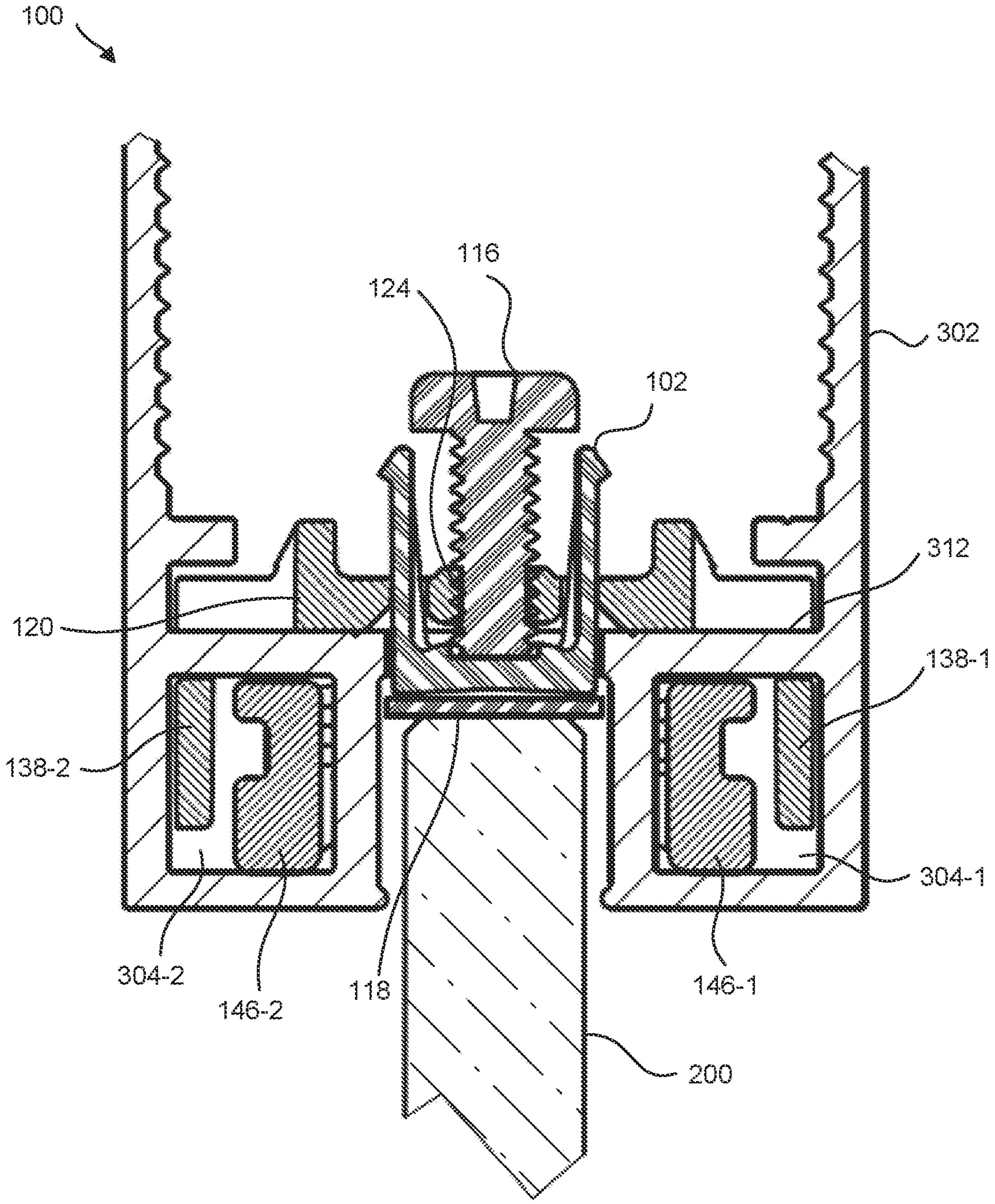
FIG. 23 illustrates a side section view of a glass panel assembly according to an example of the principles described herein.

FIG. 22 is a front section view illustrating the glass adjustment assembly 101 in an assembled configuration on the glass panel 200, the horizontal frame structure 302 and the vertical frame structure 402. FIG. 23 is a side section view illustrating the glass adjustment assembly 101 in an assembled configuration on the glass panel 200 and the horizontal frame structure 302, In particular, FIG. 23 illustrates how the tabs 138-1 and 138-2 of the horizontal connection member 120 and the arms 1464 and 146-2 of the vertical connection member 142 project into the cavities 304-1 and 304-2 of the horizontal frame structure 302 when in an assembled configuration.

As seen in FIGS. 18-22, a cinching member 156 attaches the vertical connection member 142 and the horizontal connection member 120. For example, the cinching member 156 may include a screw. The cinching member 156 may pass through the unthreaded opening 132 of the horizontal connection member 120 and connect to the threaded opening 148 of the vertical connection member 142.

In some examples, the cinching member 156 connects the vertical connection member 142 and the horizontal connection member 120 to a variable degree. For example, the cinching member 156 may allow for a variable angle between the vertical connection member 142 and the horizontal connection member 120 when the horizontal frame structure 302 and the vertical frame structure 402 are installed on the glass panel 200.

The cinching member 156 may provide a variable tightness in locking the horizontal connection member 120 and the vertical connection member 142. For example, as the screw of the cinching member 156 is turned, the amount of force exerted on the horizontal connection member 120 and the vertical connection member 142 may change.

In some examples, the cinching member 156 may provide variable spacing between the horizontal connection member 120 and the vertical connection member 142. For example, the cinching member 156 may be angularly positioned between the horizontal connection member 120 and the vertical connection member 142. As seen in FIG. 22, a gap may exist between the angled cinching wall 130 of the horizontal connection member 120 and the angled surface 147 of the vertical connection member 142. This gap may allow for variation in distances between components when the horizontal frame structure 302 and the vertical frame structure 402 are installed on the glass panel 200.

In some examples, the vertical frame structure 402 and the horizontal frame structure 302 may form a door frame for a glass panel door. In this case, the glass adjustment assembly 101 may be positioned between a corner connection of the vertical frame structure 402 and the horizontal frame structure 302 of the door frame. The clamp 102 is slidably mounted on the horizontal connection member 120 to provide an adjustable pressure between the glass panel 200 and the horizontal frame structure 302.

Returning to the discussion of FIGS. 1 and 2, the glass panel assembly 100 includes a vertical frame structure 402-1 that has a first end top end) and a second end (e.g., bottom end), the vertical frame structure 402-1 is positioned along a vertical side of the glass panel 200. A vertical connection member 142 attaches to the first end of a vertical frame structure 402-1.

The glass panel assembly 100 also includes a first horizontal frame structure 302-1 that is to be positioned along a first horizontal side top side) of the glass panel 200. A horizontal connection member 120 attaches to an end of the first horizontal frame structure 302-1. A cinching member 156 attaches the vertical connection member 142 and the horizontal connection member 120 to a variable degree.

A clamp 102 slidably attaches to the horizontal connection member 120. The clamp 102 provides a mounting connection on the first horizontal side of the glass panel 200. A locking member 116 is variably attached to the horizontal connection member 120. For example, a threaded connection may be made by threads of the locking member 116 that connect to corresponding threads of a threaded opening 124 on the horizontal connection member 120.

The glass panel assembly 100 also includes a second horizontal frame structure 302-2 that is positioned along a second horizontal side (e.g., a bottom side) of the glass panel 200. The second horizontal frame structure 302-2 is to attach to the second end (e.g., bottom end) of the vertical frame structure 402-1.

In some examples, the same types of components (e.g., horizontal connection member 120, vertical connection member 142, and cinching member 156) used in the upper glass adjustment assemblies (e.g., 101-1, 101-3) may be used in bottom glass adjustment assemblies (e.g., 101-2, 101-4). For example, the same types of components used to attach the vertical frame structures (402-1, 402-2) to the first horizontal frame structure 302-1 may be used to attach the vertical frame structures (402-1, 402-2) to the second horizontal frame structure 302-2 at the bottom side of the glass panel 200. In some examples, the bottom glass adjustment assemblies (e.g., 101-2, 101-4) located at the bottom side of the glass panel 200 may not include a locking member. Instead, the locking member(s) 116 of the upper glass adjustment assemblies (e.g., 101-1, 101-3) may provide adjustable pressure to the glass panel 200 that is transferred to the bottom glass adjustment assemblies (e.g., 101-2, 101-4).

The locking member 116 applies an adjustable pressure to the clamp 102. For example, as the locking member 116 turns, the locking member 116 may project into the clamp 102 to create pressure on the clamp 102. As the locking member 116 is turned, the locking member 116 forces the clamp 102 into the first horizontal side of the glass panel 200. The adjustable pressure is transmitted between the glass panel 200 and the horizontal connection member 120, The compression of the glass panel 200 between the clamp 102 and the second horizontal frame structure 302-2 tensions the vertical frame structure 402-1. This tension in the vertical frame structure 402-1 may be transferred to the first horizontal frame structure 302-1 through the cinching member 156, which in turn generates tension within the first horizontal frame structure 302-1. This tension within the first horizontal frame structure 302-1 may reduce sag within the first horizontal frame structure 302-1. A reduction in sag within the frame structure may allow for thinner frame structure.

The material of the glass adjustment assembly 101 may be metal, plastic, or a combination thereof. The material may comprise sound absorbing features. Foams, plastic, coatings, cellulosic material, fabric and other materials may also be included.

Figure 24:
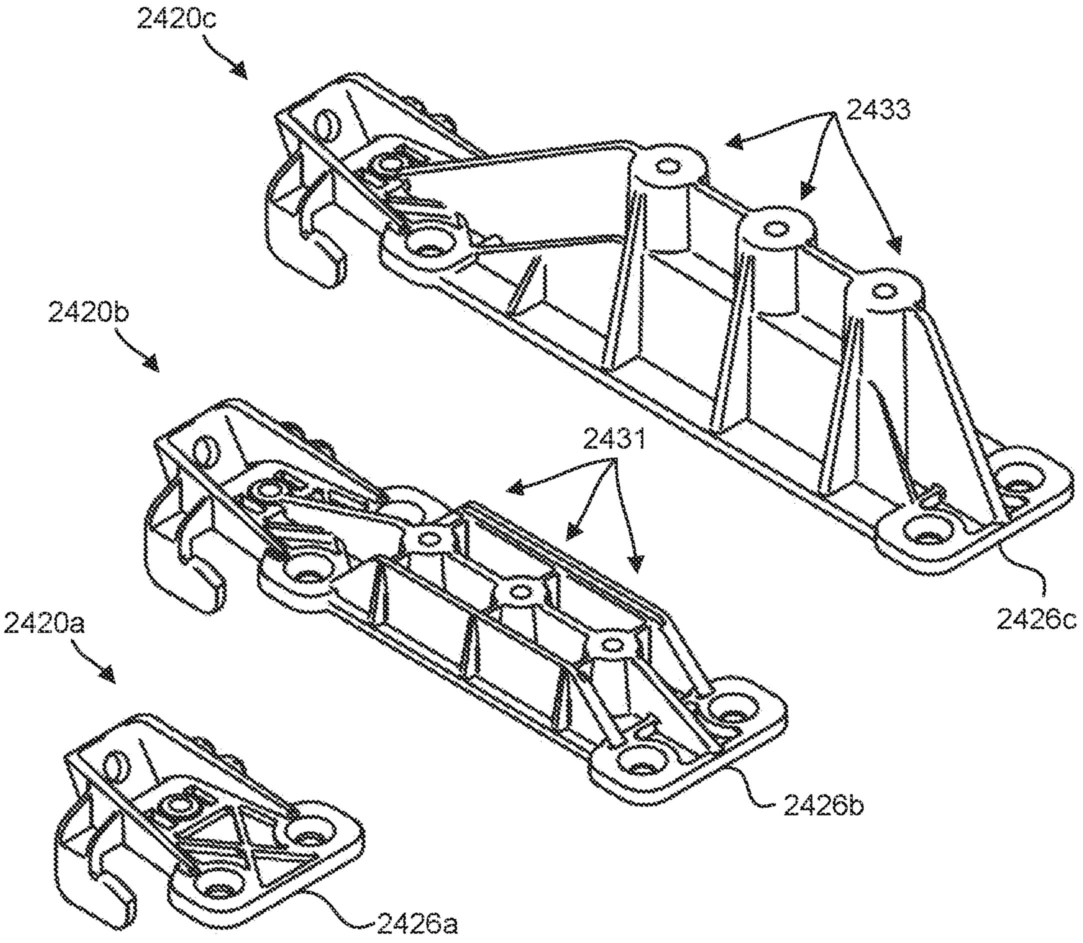
FIG. 24 illustrates perspective views of different implementations of horizontal connection members according to an example of the principles described herein.

FIG. 24 illustrates perspective views of different implementations of horizontal connection members 2420*a-c* according to an example of the principles described herein. The different implementations of the horizontal connection members 2420*a-c* may allow external hardware (e.g., hinges, pivots, etc.) to mount onto the door without additional components. A first horizontal connection member 2420*a* may be implemented according to the horizontal connection member 120 described above. For example, the first horizontal connection member 2420*a* includes a base 2426*a* configured to slide within channels of a horizontal frame structure.

For the second horizontal connection member 24210, the base 2426*b* may be configured to slide within channels of a horizontal frame structure. However, the base 2426*b* may be extended to accommodate a number of hardware mounting features 2431. For example, the hardware mounting features 2431 may include a number of holes and support ribs projecting from the base 2426*b*.

For the third horizontal connection member 2420*c*, the base 2426*c* may be configured to slide within channels of a horizontal frame structure. However, the base 2426*c* may be extended to accommodate a number of hardware mounting features 2433 (e.g., holes and support ribs) projecting from the base 2426*c*. It should be noted that the base 2426*c* and hardware mounting features 2433 are sized to accommodate different hardware and/or fasteners than the second horizontal connection member 2420*b*.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A glass adjustment assembly, comprising:

a locking member;

a clamp that includes a base member with side extensions on either side; and a horizontal connection member, the side extensions of the clamp to be slidably mounted to the horizontal connection member, the locking member to be variably attached to the horizontal connection member, the variable attachment to apply controlled pressure on the base member of the clamp which is transmitted to a glass panel;

wherein the base member of the clamp comprises a curved bottom surface that is to apply a bias force to the glass panel in response to the pressure applied on the base member by the locking member.

2. The glass adjustment assembly of claim 1, wherein the glass adjustment assembly is to be positioned between a corner connection of a vertical frame structure and a horizontal frame structure of a door frame, the clamp slidably mounted on the horizontal connection member to further provide an adjustable pressure between the glass panel and the horizontal frame structure.

3. The glass adjustment assembly of claim 1, further comprising adhesive tape to be positioned between the clamp and the glass panel.

4. The glass adjustment assembly of claim 1, wherein the curved bottom surface of the base member comprises a concave bowl.

5. The glass adjustment assembly of claim 1, wherein the horizontal connection member to attach to an end of a horizontal frame structure.

6. The glass adjustment assembly of claim 5, wherein the horizontal connection member comprises a pair of tabs to be inserted into a pair of cavities in the end of the horizontal frame structure.

7. The glass adjustment assembly of claim 1, wherein the horizontal connection member comprises openings to receive the side extensions of the clamp, the openings to enable a linear movement of the clamp in response to the variable attachment of the locking member.

8. The glass adjustment assembly of claim 1, wherein the locking member comprises a screw.

9. The glass adjustment assembly of claim 8, wherein the horizontal connection member comprises a threaded opening to receive the screw of the locking member.

10. The glass adjustment assembly of claim 1, wherein the locking member is to provide a controlled pressure to the clamp, to limit the pressure applied to the glass panel.

11. A glass adjustment assembly, comprising:

a vertical connection member that is to attach to an end of a vertical frame structure;

a horizontal connection member that is to attach to an end of a horizontal frame structure;

a cinching member that is to attach the vertical connection member and the horizontal connection member to a variable degree;

a clamp that is to slidably attach to the horizontal connection member, the clamp to provide a mounting connection to a glass panel; and a locking member to apply an adjustable pressure to the clamp, wherein the adjustable pressure is transmitted between the glass panel and the horizontal connection members.

12. The glass adjustment assembly of claim 11, wherein the cinching member comprises a screw.

13. The glass adjustment assembly of claim 12, wherein the horizontal connection member comprises an unthreaded opening, and the vertical connection member comprises a threaded opening to receive the screw of the cinching member through the unthreaded opening of the horizontal connection member.

14. The glass adjustment assembly of claim 11, wherein the cinching member is to provide a variable tightness in locking the horizontal connection member and the vertical connection member.

15. The glass adjustment assembly of claim 14, wherein the cinching member is to further provide variable spacing between the horizontal connection member and the vertical connection member, the cinching member being angularly positioned between the horizontal connection member and the vertical connection member.

16. A glass panel assembly, comprising:

a glass panel;

a vertical frame structure comprising a first end and a second end, the vertical frame structure positioned along a vertical side of the glass panel;

a first horizontal frame structure positioned along a first horizontal side of the glass panel;

a second horizontal frame structure positioned along a second horizontal side of the glass panel;

a first glass adjustment assembly positioned at a first corner of the glass panel to attach to the first end of the vertical frame structure and the first horizontal frame structure; and a second glass adjustment assembly positioned at a second corner of the glass panel to attach to the second end of the vertical frame structure and the second horizontal frame structure, wherein each glass adjustment assembly comprises:

a vertical connection member;

a horizontal connection member;

a cinching member that attaches the vertical connection member and the horizontal connection member to a variable degree; and a clamp attached to the horizontal connection member, the clamp to provide a mounting connection on the glass panel, and wherein the first glass adjustment assembly further comprises a locking member to apply an adjustable pressure to the clamp of the first glass adjustment assembly, wherein the adjustable pressure is transmitted to the glass panel and the second glass adjustment assembly.

17. The glass panel assembly of claim 16, wherein the locking member forces the clamp of the first glass adjustment assembly into the first horizontal side of the glass panel.

18. The glass panel assembly of claim 17, wherein the adjustable pressure applied by the locking member compresses the glass panel between the clamp of the first glass adjustment assembly and the clamp of the second glass adjustment assembly.

19. The glass panel assembly of claim 18, wherein the compression of the glass panel between the first glass adjustment assembly and the second glass adjustment assembly generates tension in the vertical frame structure.

* * * * *